US008930552B2

(12) United States Patent
Ueno

(10) Patent No.: US 8,930,552 B2
(45) Date of Patent: Jan. 6, 2015

(54) APPLICATION SWITCH SYSTEM AND APPLICATION SWITCH METHOD

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

(21) Appl. No.: 13/196,579

(22) Filed: Aug. 2, 2011

(65) Prior Publication Data

US 2011/0289230 A1 Nov. 24, 2011

Related U.S. Application Data

(63) Continuation of application No. PCT/JP2010/051424, filed on Feb. 2, 2010.

(30) Foreign Application Priority Data

Feb. 3, 2009 (JP) .................................. 2009-023112
Jun. 11, 2009 (JP) .................................. 2009-140082

(51) Int. Cl.
G06F 15/16 (2006.01)
H04L 12/28 (2006.01)
G06F 15/173 (2006.01)
H04W 40/22 (2009.01)
H04L 12/717 (2013.01)
H04L 29/08 (2006.01)
H04L 29/06 (2006.01)

(52) U.S. Cl.
CPC ............... *H04W 40/22* (2013.01); *H04L 45/42* (2013.01); *H04L 67/2814* (2013.01); *H04L 69/161* (2013.01); *H04L 69/163* (2013.01); *H04L 67/1038* (2013.01)
USPC ........... 709/228; 709/217; 709/219; 709/227; 370/229; 370/231; 370/235; 370/236; 370/237; 370/238; 370/396; 370/398

(58) Field of Classification Search
USPC .......... 709/228, 217, 219, 227; 370/235, 236, 370/237, 238, 396, 398
See application file for complete search history.

(56) References Cited

U.S. PATENT DOCUMENTS 5,941,988 A 8/1999 Bhagwat et al.
6,006,264 A 12/1999 Colby et al.
(Continued)

FOREIGN PATENT DOCUMENTS

JP 2000-286888 A 10/2000
JP 2000-316025 A 11/2000
(Continued)

OTHER PUBLICATIONS

Yamada, Hitoshi et al. Nov. 4, 2003 "QoS Control by Traffic Engineering in Content Delivery Network." Retrieved on Aug. 4, 2014 from <www.fujitsu.com/downloads/MAG/vol39-2/paper13.pdf>.*

(Continued)

*Primary Examiner* — Kamal DiVecha
*Assistant Examiner* — Juan C Turriate Gastulo
(74) *Attorney, Agent, or Firm* — McGinn IP Law Group, PLLC

(57) ABSTRACT

An application switch system includes a switch configured to control a connection between a plurality of client terminals and a plurality of servers which exist on a network, a relay unit configured to perform a protocol relay, and a controller that includes a section configured to perform a centralized control on a route table used to determine a destination in the switch, a section configured to control relay processing of the relay unit, a section configured to select one server as a connection destination from the plurality of servers, a section configured to select a route which links between one client terminal of the plurality of client terminals and the selected connection destination server, and which contains the relay unit, and set the selected route to the route table in the switch, and a section configured to set relay information used when the relay unit performs the protocol relay.

23 Claims, 12 Drawing Sheets

(56) References Cited

U.S. PATENT DOCUMENTS

| | | | |
|---|---|---|---|
| 6,449,647 | B1 | 9/2002 | Colby et al. |
| 7,000,027 | B2 | 2/2006 | Hensbergen |
| 7,463,629 | B2* | 12/2008 | Onoe et al. ............... 370/392 |
| 7,512,702 | B1* | 3/2009 | Srivastava et al. ......... 709/238 |
| 7,644,164 | B2* | 1/2010 | Saiki et al. ............... 709/227 |
| 7,802,000 | B1* | 9/2010 | Huang et al. .............. 709/228 |
| 2001/0048683 | A1* | 12/2001 | Allan et al. ............ 370/395.21 |
| 2002/0069369 | A1* | 6/2002 | Tremain ................... 713/201 |
| 2002/0194342 | A1 | 12/2002 | Lu et al. |
| 2003/0002863 | A1 | 1/2003 | Shinohara |
| 2003/0101273 | A1 | 5/2003 | Hensbergen |
| 2003/0110259 | A1* | 6/2003 | Chapman et al. ........... 709/225 |
| 2003/0149755 | A1* | 8/2003 | Sadot ...................... 709/223 |
| 2004/0039820 | A1 | 2/2004 | Colby et al. |
| 2004/0076154 | A1* | 4/2004 | Mizutani et al. .......... 370/389 |
| 2005/0193114 | A1 | 9/2005 | Colby et al. |
| 2006/0130064 | A1* | 6/2006 | Srivastava ................ 718/102 |
| 2006/0242227 | A1* | 10/2006 | Rao et al. ................ 709/203 |
| 2007/0115975 | A1* | 5/2007 | Zhang ..................... 370/390 |
| 2007/0189257 | A1* | 8/2007 | Suzuki et al. ............ 370/338 |
| 2008/0235382 | A1* | 9/2008 | Marwah et al. ............ 709/228 |
| 2008/0279161 | A1* | 11/2008 | Stirbu et al. ............. 370/338 |
| 2009/0022059 | A1* | 1/2009 | Atsumi et al. ............ 370/244 |

FOREIGN PATENT DOCUMENTS

| | | |
|---|---|---|
| JP | 2002-158700 A | 5/2002 |
| JP | 2003-304293 A | 10/2003 |
| WO | WO99/06913 | 2/1999 |

OTHER PUBLICATIONS

European Office Action dated Jun. 4, 2012 with English Translation.
Supplementary European Search Report in European Office Action No. 10738514.8.
Apostolopoulos G et al: "Design, implementation and performance of a content-based switch", INFOCOM 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, vol. 3, Mar. 26, 2000, pp. 1117-1126, XP010376047, DOI: 10.1109/INFOCOM.2000.832470 ISBN:978-0-7803-5880-5.
Nick McKeown et al., "Open Flow: Enabling Innovation in Campus Networks", ACM SIGCOMM Computer Communication Review, vol. 38, No. 2, 2008 (http: //www.openflowswitch.org//documents/openflow-wp-latest.pdf), Mar. 14, 2008.
Japanese Office Action dated Oct. 9, 2013 with partial English translation thereof.
Hitoshi Yamada, et al., "Evaluation of a QoS Control Method Based on Traffic Engineering", NS2003-188 CQ2003-105 TM2003-66 Nov. 14, 2003.
Yukio Hiranaka, "High Speed Packet Transfer through Backbone Network by Using Bridges and a Centralized Routing Control", Yamagata University, Information Processing Society of Japan, 57th National Conference Proceedings(3), Oct. 5, 1998 (with partial English translation thereof).

* cited by examiner

Fig. 5

| INPUT KEY | | | | | | OUTPUT INFORMATION | | | | | | STATE INFORMATION |
|---|---|---|---|---|---|---|---|---|---|---|---|---|
| LINE | IPDA | IPSA | TCP SP | TCP DP | LINE | IPDA | IPSA | TCP SP | TCP DP | DIFFERENCE VALUE OF SEQUENCE NO. | DIFFERENCE VALUE OF ACK NO. | TCP STATE |
| 34 | 10.1.1.1 | 10.2.1.1 | 1500 | 80 | 35 | 10.1.0.2 | 10.1.1.1 | 2020 | 80 | −4000 | 2000 | established |
| 35 | 10.1.0.2 | 10.1.1.1 | 80 | 2000 | 34 | 10.1.1.1 | 10.2.1.1 | 80 | 1500 | −2000 | 4000 | established |

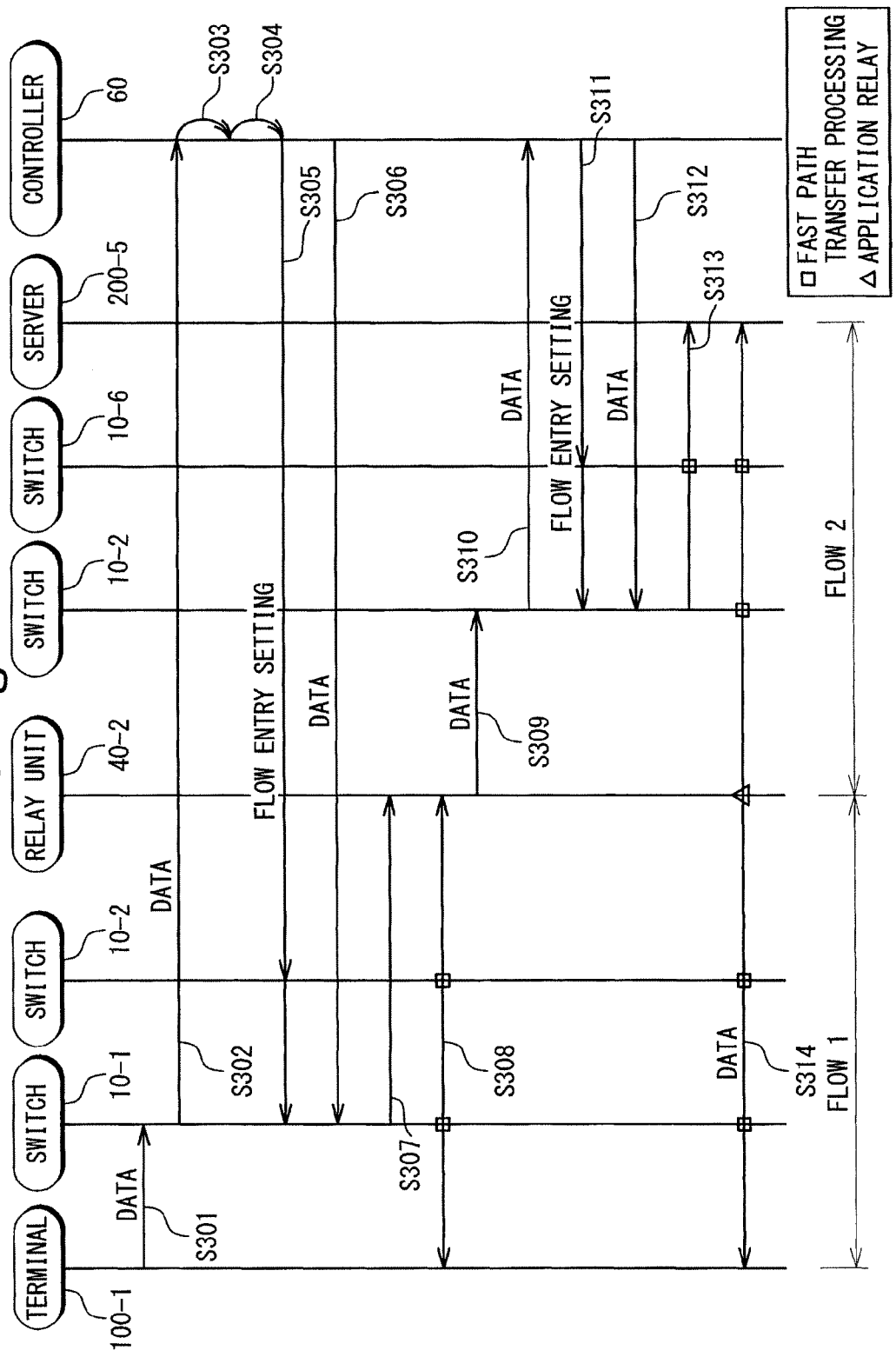

APPLICATION SWITCH SYSTEM AND APPLICATION SWITCH METHOD

CROSS-REFERENCE TO RELATED APPLICATION

This is a continuation of International Application No. PCT/JP2010/051424, filed on Feb. 2, 2010.

TECHNICAL FIELD

The present invention is related to an application switch system, and more particularly to an application switch system which performs routing control on a network.

RELATED ART

Conventionally, a problem is known that a network route is not efficient when servers as switching destinations of an application switch are distributed.

In Patent Literature 1 (U.S. Pat. No. 5,941,988), a technique is disclosed which two TCP (Transmission control Protocol) sessions called TCP splicing are relayed. The TCP splicing is a high-speed processing technique in a TCP proxy apparatus such as an application gateway, and the two TCP sessions using the TCP proxy is short-cut to relay processing in a packet level.

Also, Patent Literature 2 (U.S. Pat. No. 7,000,027) is discloses a TCP splicing as another example. In Patent Literature 2, a technique is disclosed that one of back-end nodes performs TCP termination processing, and interprets a request in an application level, and then determines which of the back-end nodes the processing should be assigned to, and performs a hand-off to the determined node. In the back-end node, an application operates to perform proxy processing, and assignment determination of the processing in the back-end node and distribution processing to the TCP splicing in the front-end node are described.

The TCP splicing shown in Patent Literature 1 is used in a relay unit called an application switch. In the processing, a TCP termination processing is performed on a first TCP session with a client, and after interpreting a message in the application level, the next node is determined. For example, in case of HTTP (Hyper Text Transfer Protocol), a request message from the client to a server is interpreted after establishing a TCP session, to know what resource an access request is destined to. Thus, the switching and load distribution processing to an actual back-end server are performed. When a distribution destination is determined, a second TCP session is established with the back-end server, and the first TCP session with the client and the second TCP session are subjected to the relay processing in the packet level.

FIG. 1 shows a conventional system which performs server load distribution processing by using an application switch. The conventional system shown in FIG. 1 is provided with client terminals 100 (100-*i*, i=1 to N: N is an optional integer), switches 10 (10-*i*, i=1 to N), an application switch 20, and servers 200 (200-*i*, i=1 to N).

In this example, client terminals 100-1 to 100-2 are shown as the client terminals 100. Switches 10-1 to 10-3 are shown as the switches 10. Servers 200-1 to 200-6 are shown as the servers 200. It should be noted that the servers 200-1 to 200-3 are connected with the application switch 20 and the servers 200-4 to 200-6 are connected with the switch 10-3.

In the conventional system shown in FIG. 1, when an access from the client terminal 100 is connected with the server 200 through the switch 10 and the application switch 20, a message of the application layer is interpreted in the application switch 20 to select one server as an actual access target from among the servers 200-1 to 200-6. Thus, relay connection is performed.

A problem of the conventional system shown in FIG. 1 will be described. In the conventional system shown in FIG. 1, because the servers 200-1 to 200-3 are typically arranged on positions which are in the neighborhood of the application switch 20 (on a side of the application switch), there is no case that the network traffic (in communications amount) becomes inefficient, even when any of the servers 200-1 to 200-3 is selected after a switch determination is performed in the application switch 20.

However, a case would be appear that the servers is deployed in a wide area, or physical positions of the servers move through use of a virtual machine called VM.

For example, in the conventional system shown in FIG. 1, when an access from the client terminal 100-1 is connected with the server 200-6 through the application switch 20, the route on the network is from the switch 10-1, to the application switch 20, to the switch 10-1, to the switch 10-2, to the switch 10-3 and then to the server 200-6.

In this way, in the conventional system shown in FIG. 1, when switch processing is performed to use the application switch, there is a case that the network route is not efficient.

In the technique shown in Patent Literature 2, in the TCP splicing processing, a distribution determination section of the application switch is deployed in the back-end node. With this, the load of the determination processing in the application switch can be distributed. However, in this method, it is necessary that front-end processing which performs the TCP splicing is on the routes to the plurality of back-end nodes, and there is a case that the relay processing is not efficient when the servers are distributed in the wide area.

That is, because the traffic from the client to the server always passes the front-end node even if the back-end nodes are distributed in the wide area, there is a problem that the route is fixed irrespective of a distance on the network between the server and the client.

CITATION LIST

[Patent literature 1]: U.S. Pat. No. 5,941,988
[Patent Literature 2]: U.S. Pat. No. 7,000,027

SUMMARY OF THE INVENTION

A subject matter of the present invention is to provide a method of efficiently performing application relay processing. Even when distribution targets in an application switch are distributed in a wide area, an optimal relay node is selected without going through a single relay node, resulting in efficient network accommodation.

An application switch system of the present invention is provided with a switch which controls a connection between a plurality of client terminals and a plurality of servers which exists on a network, a relay unit configured to perform, protocol relay and a controller. The controller is provided with a section configured to perform the centralized control on a route table used to determine a destination in the switch, a section configured to control relay processing of the relay unit; a section configured to select one server as a connection destination from the plurality of servers, select a route so as to link between one client terminal of the plurality of client terminals and the selected server, and so as to contain the relay unit, and set the selected route to a route table in the switch;

and a section configured to set relay information used when the relay unit performs the protocol relay to the relay unit.

Also, another application switch system of the present invention is provided with a switch configured to control a connection between a plurality of client terminals and a plurality of servers which exist on a network, a relay unit which performs a protocol relay, and a controller. The controller is provided with a section configured to perform centralized control on a route table used to determine a switch destination, a section configured to control relay processing of the relay unit, a section configured to determine a server group as a candidacy of a connection destination from the plurality of servers, a section configured to select the relay unit which links between one client of the plurality of client terminals and each of the servers of the connection destination candidacy and perform relay processing to the plurality of servers group, a section configured to select a route which contains the relay unit and set the selected route to the route table in the switch, and a section configured to set relay information used when the relay unit performs the protocol relay, to the relay unit.

In the application switch method of the present invention, a connection between a plurality of client terminals and a plurality of servers which exist on a network is controlled by a switch. Next, by a relay unit, the protocol relay is performed. Next, by a controller, centralized control is performed on a route table used to determine a transfer destination in the switch. Next, by the controller, the relay processing of the relay unit is controlled. Next, by the controller, the server as a connection destination is selected from the plurality of servers. Next, by the controller, a route is selected to link between one client of the plurality of client terminals and the selected server and to contain the relay unit. Next, by the controller, the selected route is set to the route table in the switch. Next, by the controller, relay information used when the relay unit performs the protocol relay is set to the relay unit.

By executing a program according to the present invention, a computer performs the following operations: first, the computer attains a plurality of servers, a switch and a relay unit as applications of the virtual machines on the computer. Also, by the switch, a connection between the plurality of client terminals and the plurality of servers which exist on the network is controlled. Also, by the relay unit, the protocol relay is performed. Also, the centralized control is performed on a route table used to determine a transfer destination in the switch. Also, the relay processing of the relay unit is controlled. Also, the server as a connection destination is selects from the plurality of servers. Also, a route is selected to link between one client of the plurality of client terminals and the selected server and to contain the relay unit. Also, the selected route is set to the route table in the switch. Also, relay information used when the relay unit performs the protocol relay is set to the relay unit. It should be noted that it is possible to store the program according to the present invention in a storage medium and a storage unit.

Thus, in application switch processing, by separating a unit which performs switch determination processing and a relay unit and by making it possible to deploy a TCP relay node in an optional position, optimization of a network route between the server and the client can be realized.

BRIEF DESCRIPTION OF THE DRAWINGS

FIG. 5 is a diagram showing an example of an entry of a conversion table according to the first exemplary embodiment of the present invention;

FIG. 12 is a sequence chart showing an operation of the application switch system in the third exemplary embodiment.

DESCRIPTION OF EXEMPLARY EMBODIMENTS

First Exemplary Embodiment

Hereinafter, a first exemplary embodiment of the present invention will be described with reference to the attached drawings.

Figure 1:
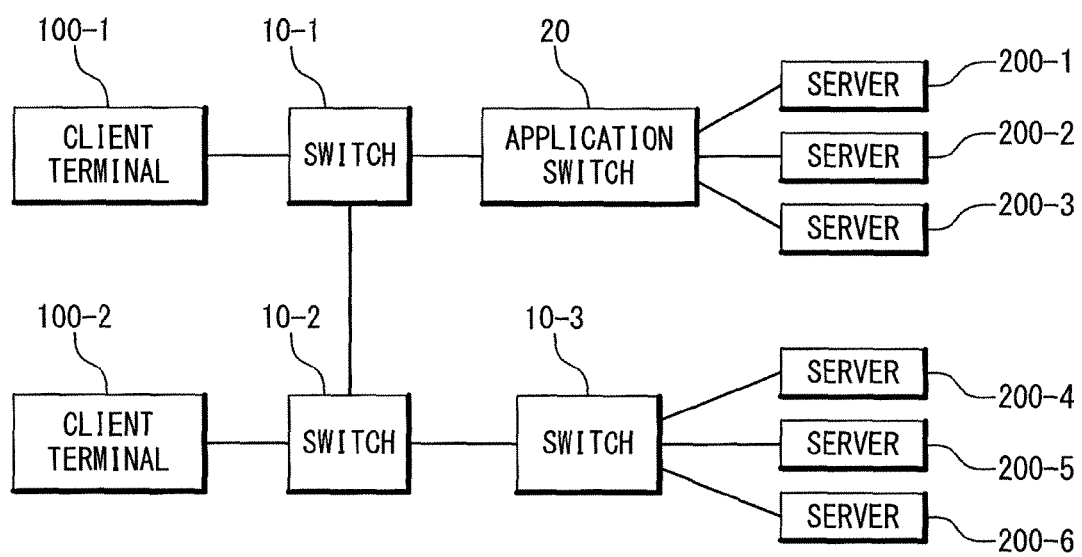
FIG. 1 is a diagram showing an example of a conventional system which performs server load distribution processing by using an application switch.
Figure 2:
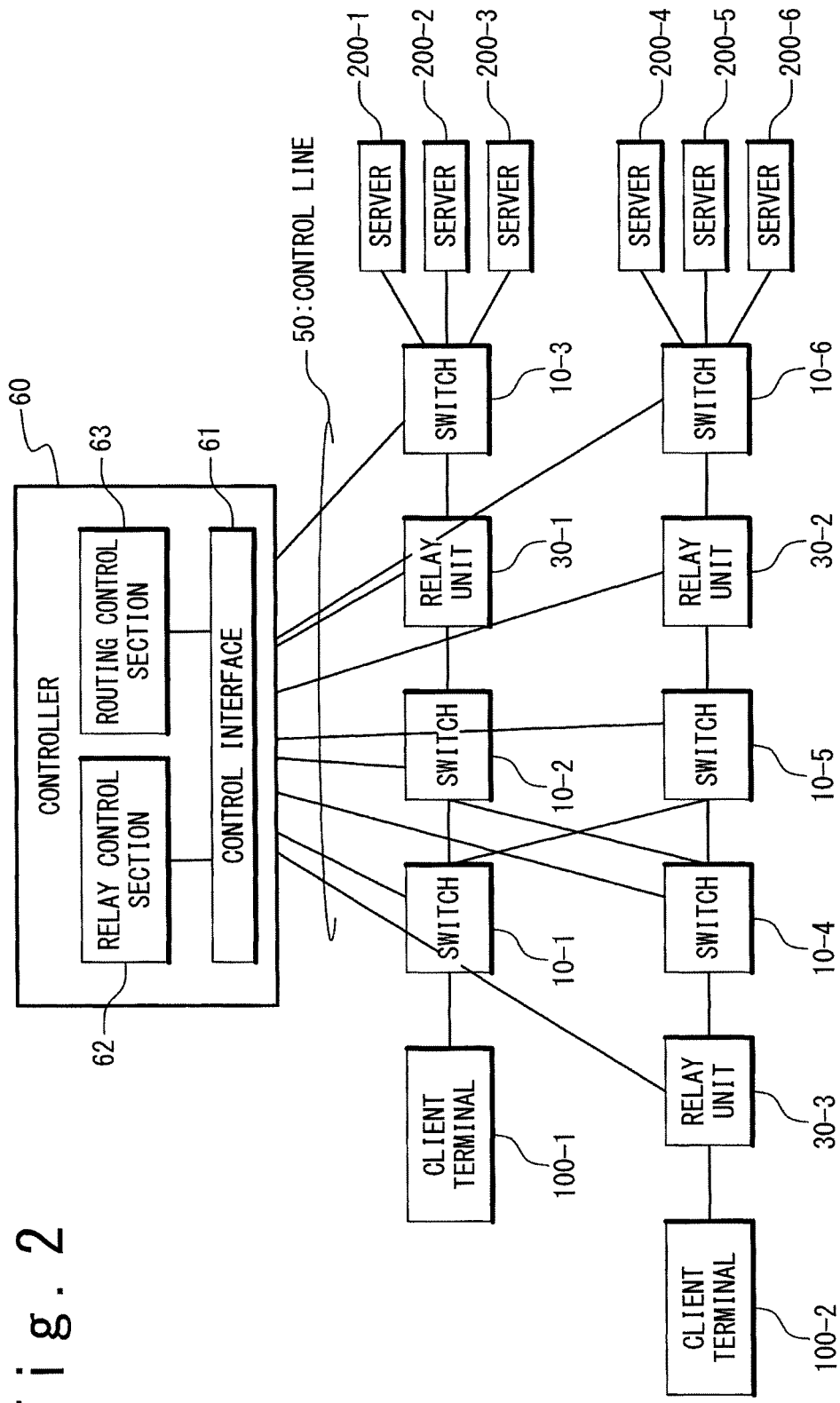
FIG. 2 is a diagram showing a configuration of an application switch system according to a first exemplary embodiment of the present invention.

As shown in FIG. 2, an application switch system of the present invention is provided with client terminals 100 (100-$i$, $i=1$ to N, N is an optional integer), switches 10 (10-$i$, $i=1$ to N), relay units 30, a control line 50, a controller 60, and servers 200 (200-$i$, $i=1$ to N).

The client terminals 100 are connected with the servers 200 through the switches 10 and the relay units 30. The switches 10 and the relay units 30 exist on a network. Here, it is supposed that the number of client terminals 100, the number of switches 10, the number of relay units 30 and the number of servers 200 are different. However, actually, the number of client terminals 100, the number of switches 10, the number of relay units 30 and the number of server 200 may be same.

The switch 10 is an application switch.

The relay unit 30 relays transmission data between the client terminal 100 and the server 200 through TCP (Transmission control Protocol) splicing.

The controller 60 is connected with the switches 10 and the relay units 30 through the control line 50 and controls the switches 10 and the relay units 30 intensively.

The controller 60 is provided with a control interface 61, a relay control section 62 and a routing control section 63.

The control interface 61 is connected with the switches 10 and the relay units 30 through the control line 50.

The relay control section 62 performs application distribution determination. Also, the relay control section 62 performs a control of the relay unit 30 (relay control). Here, the relay control section 62 performs hand-off processing on the relay unit 30. For example, the relay control section 62 issues a relay start instruction to the relay unit 30. The relay unit 30 starts relay processing in response to the relay start instruction.

The routing control section 63 performs centralized control of network routes. Also, the routing control section 63 calculates a route from the client terminal 100 as a connection source to the server 200 and selects one of the relay units 30 which is on the route. In this example, the routing control section 63 selects the relay unit 30 which is nearest to the server as an application distributed destination after the relay control section 62 determines the application distributed destination and sets a route to the selected relay unit 30

Thus, the controller 60 performs optimization of a network route by performing distribution selection to an optional one of the servers which are distributedly arranged in a wide area, selection of the optimal network route, and selection of a relay position.

As an example of the client terminal 100, a PC (personal computer), a mobile notebook type PC, a thin client terminal, a work station, a portable phone, a car navigation system, a mobile game machine, a home game machine, an interactive TV, a digital tuner, a digital recorder, information home appliance, OA (Office Automation) equipment, and so on are exemplified. The client terminal 100 may be installed into moving bodies such as a vehicle, a ship and an aircraft. However, actually, the client terminal 100 is not limited to these examples.

As an example of a communication line and the control line 50 on the network to which the switches 10 and the relay units 30 belong, the Internet, LAN (Local Area Network), wireless LAN (Wireless LAN), WAN (Wide Area Network), Backbone, community antenna television (CATV) line, a fixed telephone network, a mobile phone network, WiMAX (IEEE 802.16a), 3G (3rd Generation), lease line, IrDA (Infrared Data Association), Bluetooth (registered trademark), serial communication line, a data bus and so on are exemplified. However, actually, the communication line is not limited to these examples.

As an example of the controller 60 and the servers 200, computers such as PC (personal computer), thin client server, a work station, a main frame, and a supercomputer are exemplified. However, actually, the controller 60 and the server 200 are not limited to these examples.

A function of each unit in case of connection from the client terminal 100 to the server 200 will be described, by using as an example a case of connection from the client terminal 100-1 to predetermined service in the application switch system shown in FIG. 2.

The client terminal 100-1 issues a TCP connection request to the controller 60. In this example, the client terminal 100-1 transmits a packet having the controller 60 as a destination to try the TCP connection. At this time, viewing from the client terminal 100-1, the controller 60 is viewed as one server 200. That is, the client terminal 100-1 regards the controller 60 as the server 200.

When receiving the packet transmitted from the client terminal 100-1, the switch 10-1 performs transfer processing based on a flow entry of the switch 10.

When no flow entry is registered in the initial state, the switch 10-1 sends the packet transmitted from the client terminal 100-1 to the controller 60 through the control line 50.

The controller 60 performs processing to stack in a TCP protocol stack, the TCP connection request from the client terminal 100-1. It should be noted that when transmitting a packet to the client terminal 100-1, the controller 60 transmits the packet through the switch 10-1.

The controller 60 selects the server 200 to be connected (as an access target) based on transmission data from the client terminal 100-1. As a selection method, there is used any of a method of averaging load of the server 200, a method of selecting one server nearest to the client terminal 100-1 in the network, and so on.

After selecting the server 200, the controller 60 establishes a second TCP connection between the controller 60 and the server 200.

Moreover, the controller 60 selects the relay unit 30 which is on the route between the client terminal 100-1 and the server 200 or which is in a position near to the route, and executes the TCP splicing by using information of the first TCP connection and information of the second TCP connection. With this, access processing between the client terminal 100-1 and the server 200 is changed from proxy processing through the controller 60 to packet relay processing through relay processing.

Figure 3:
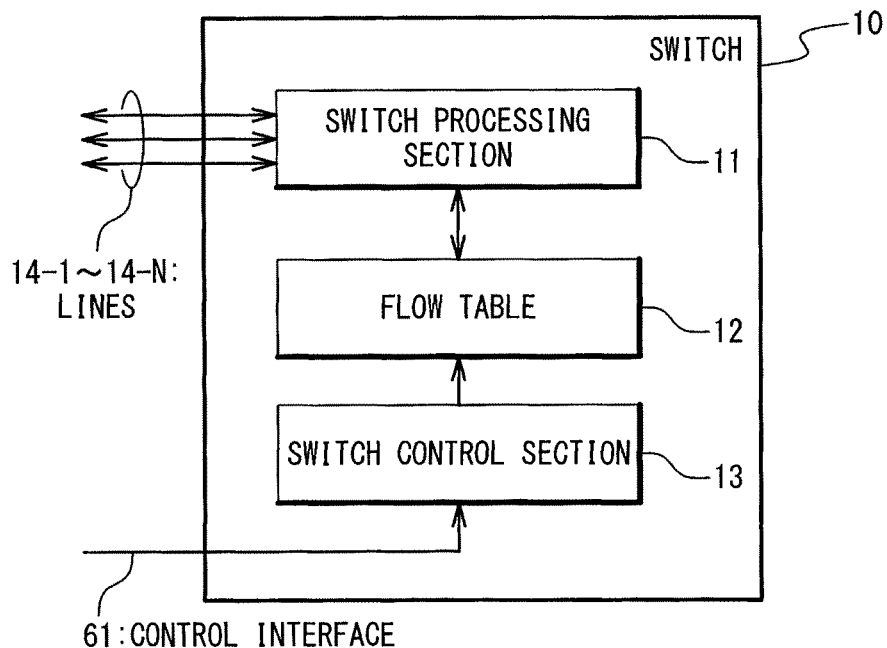
FIG. 3 is a diagram showing a configuration of a switch according to the first exemplary embodiment of the present invention.

Referring to FIG. 3, a configuration of the switch 10 according to the first exemplary embodiment of the present invention will be described. The switch 10 is provided with a switch processing section 11, a flow table 12, a switch control section 13 and lines 14 (14-$i$, $i$=1 to N).

The switch processing section 11 extracts header data from the packet received through the line 14, and refers to the flow table 12 based on the header data to determine an output line. Also, the switch processing section 11 is connected with the client terminals 100, the other switches 10, the relay units 30 and the servers 200 through the lines 14. In this example, the switch processing section 11 extracts the header data from the packet received through the lines 14 (14-$i$, $i$=1 to N), and refers to the flow table 12 based on the header data to determine the output line.

Data extracted from a MAC (Media Access control) header, an IP (Internet Protocol) header, and the layer 4 header is registered in the flow table 12 as flow identification data, and the flow table 12 has an entry in which stores output information to the flow. As an example of the output information to the flow, action information such as rewrite of the output line and the header is considered. In this example, it is sufficient that the flow table 12 is based on a flow identifier such as flow information specified with an IP address and a TCP port number, other labels, and so on.

The switch control section 13 is connected with the controller 60 through the control interface 61. At this time, the switch control section 13 is connected with the control interface 61 through the control line 50. That is, the switch control section 13 receives instructions and operations, and other data from the controller 60, through the control line 50. In this example, the switch control section 13 performs control communication with the controller 60, and controls the internal state of the switch 10. The controller 60 performs controls such as the registration and deletion of the flow entry through the switch control section 13. Also, the switch control section 13 transmits a packet having no hit to the flow entries to the controller 60 through the control interface 61, and performs transmission processing to a specified output line in response to a packet transmission instruction from the controller 60.

The lines 14 (14-$i$, $i$=1 to N) are communication lines connected with the client terminals 100, the other switches 10, the relay units 30 and the servers 200.

Figure 4:
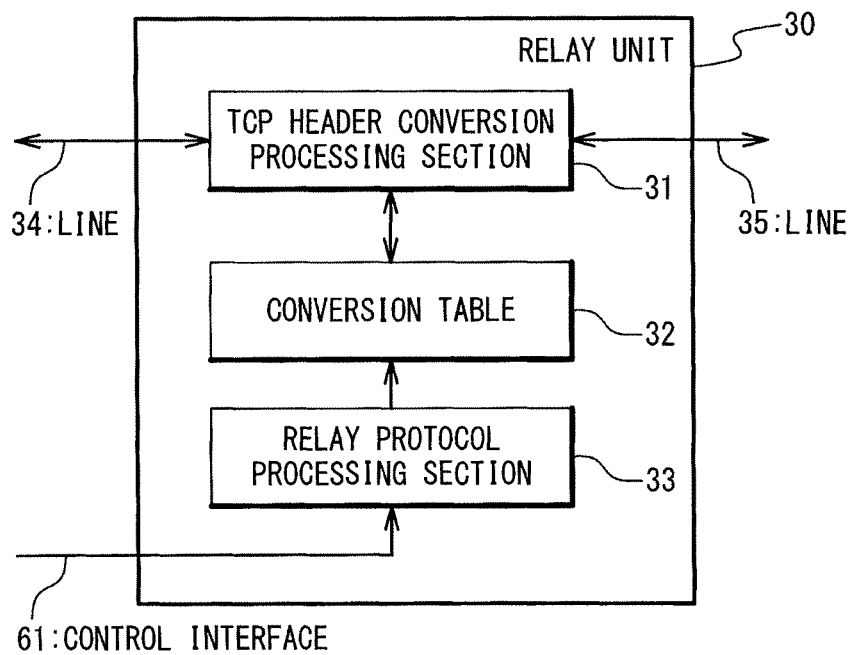
FIG. 4 is a diagram showing a configuration of a relay unit according to the first exemplary embodiment of the present invention.

Referring to FIG. 4, a configuration of the relay unit 30 according to the first exemplary embodiment of the present invention will be described.

The relay unit 30 is provided with a TCP header conversion processing section 31, a conversion table 32, a relay protocol processing section 33, a line 34 and a line 35.

The TCP header conversion processing section 31 is connected with external units through the line 34 and the line 35. In this example, the TCP header conversion processing section 31 is connected with the client terminals 100, the other switches 10, the relay units 30 and the servers 200 through the line 34 and the line 35. Also, the TCP header conversion processing section 31 performs TCP header conversion processing on the packet sent and received through the line 34 and the line 35 based on the conversion table 32. In this example, the TCP header conversion processing section 31 refers to the conversion table 32 and performs the header conversion processing on the packet received from the line 34 or the line 35 to replace the header of the received packet with the header described in the conversion table 32, when the header of the received packet hits the header described in the conversion table 32.

Information necessary for the TCP splicing is described in the conversion table 32. In this example, the conversion table 32 has as the entry, an input key, output information, and state data. The TCP header conversion processing section 31 refers to the conversion table 32 to search the entries based on an IP address and a TCP port number as an input key, and to acquire rewrite values of the IP address and the TCP port number and a correction value for re-calculation of a sequence number.

The relay protocol processing section 33 is connected with the controller 60 through the control interface 61. At this time, the relay protocol processing section 33 is connected with the control interface 61 through the control line 50. That is, the relay protocol processing part 33 receives instructions and operations, and other data from the controller 60, through the control line 50. In this example, the relay protocol processing section 33 performs protocol processing for the relay control such as a hand-off instruction and a relay start instruction from the controller 60. At this time, the relay protocol processing section 33 performs the setting of the conversion table 32 which is necessary for the TCP splicing, in response to the hand-off instruction. Also, the relay protocol processing section 33 sets the splicing processing for the flow valid in response to the relay start instruction and transmits packets having saved in a buffer.

The line 34 and the line 35 are the communication lines connected with the client terminals 100, the other switches 10, the relay units 30 and the servers 200.

It should be noted that the relay unit 30 may have a switching function. In this example, a unit having a function of the relay processing according to the present invention is referred to as the relay unit 30. A line switch having no relay processing function is referred to as the switch 10, and the switch 10 and the relay unit 30 are distinguished therebetween.

Referring to FIG. 5, an example of the entry in the conversion table 32 will be described.

The conversion table 32 contains a line number, an IP destination address (IPDA), an IP source address (IPSA), a TCP source port number (TCPSP) and a TCP destination port number (TCPDP), as an input key.

The TCP header conversion processing section 31 refers to the conversion table 32 and performs a determination of whether an entry hit to the header data exists, by comparing the header data of the received packet with these input keys.

Data necessary to convert the header data is written in the output information of the conversion table 32. In this example, the conversion table 32 contains as the output information, an output line number, an IP destination address (IPDA), an IP source address (IPSA), a TCP source port number (TCPSP), a TCP destination port number (TCPDP), a difference value of sequence number, and a difference value of ACK number. The TCP header conversion processing section 31 refers to the conversion table 32 to provide the IP destination address (IPDA), the IP source address (IPSA), the TCP source port number (TCPSP) and the TCP destination port number (TCPSP) to the output packet. Also, the difference value of sequence number and the difference value of ACK number have been stored for the TCP splicing.

Also, the conversion table 32 contains flow management information as state information. In this example, the TCP header conversion processing section 31 stores a TCP state as the flow management information in the conversion table 32.

It should be noted that the switch 10 and the relay unit 30 may be realized as a program which operate on a CPU (Central Processing Unit). Also, the switch 10 and the relay unit 30 may be realized as a hardware circuit.

Figure 6A:
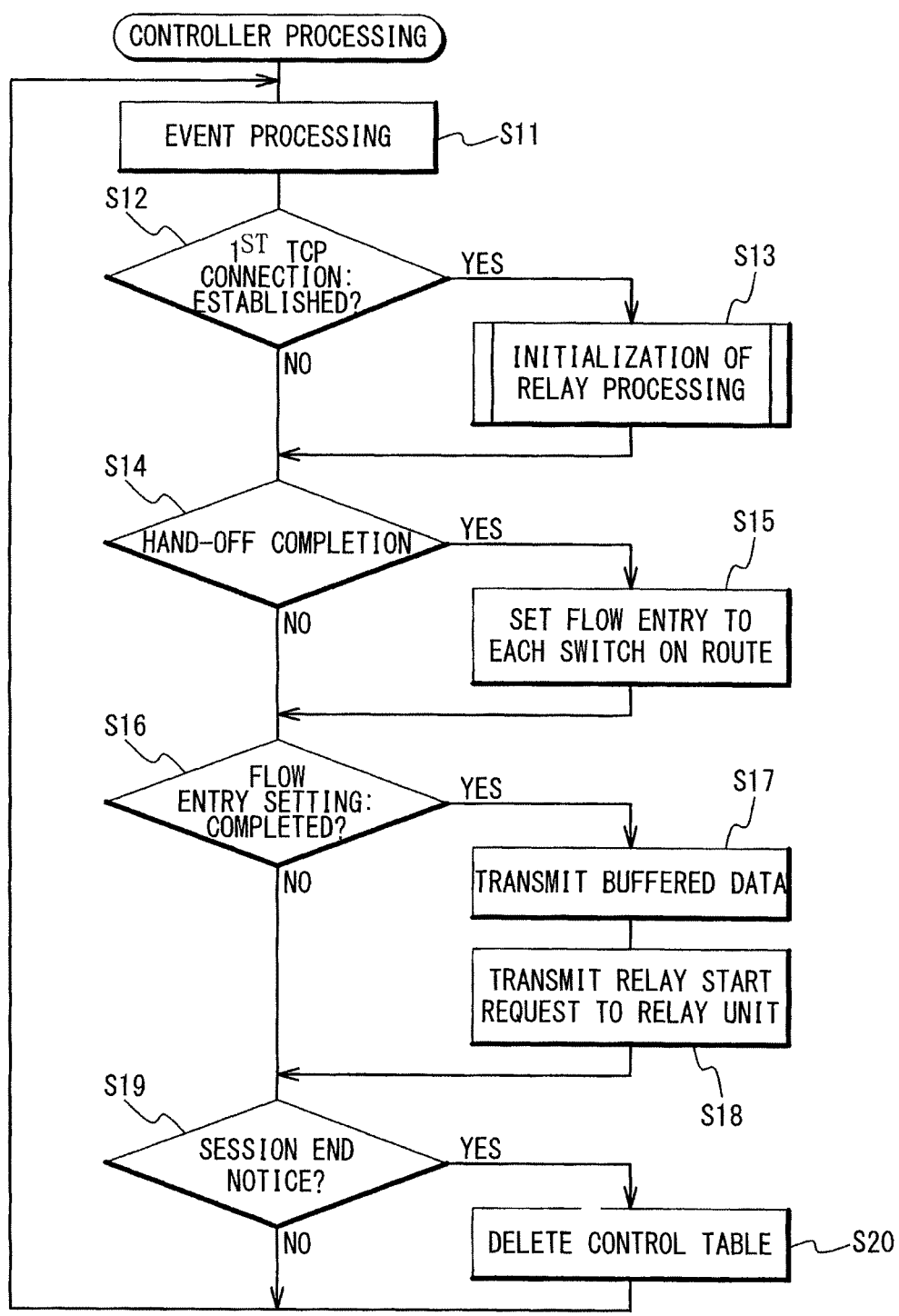
FIG. 6A is a flow chart showing processing of a controller according to the first exemplary embodiment of the present invention.

Referring to FIG. 6A, the processing of the controller 60 will be described. It should be noted that in FIG. 6A, only a part, which is related to the present invention, of the processing of the controller 60 is shown.

(1) Step S11

The controller 60 starts event processing in response to a packet supplied externally as a trigger.

(2) Step S12

The controller 60 determines a kind of an event through the event processing. In this example, the controller 60 determines whether or not the event is an event of establishing a first TCP connection between the client terminal 100 and the controller 60.

(3) Step S13

The controller 60 performs initialization processing of the relay processing when the event is the first TCP connection establishing event. The controller 60 establishes a second TCP connection between it and the server 200 as a connection destination, after performing stop setting to the first TCP connection in the initialization processing of the relay processing. Also, the controller 60 calculates a route from the client terminal 100 as the connection source to the server 200 as the connection destination, selects one of the relay units 30 which are on the route, and transmits a hand-off request to the selected relay unit 30 based on information of the first and second TCP connections. The details of the initialization processing of the relay processing will be described later. The controller 60 returns to the event processing again after the initialization processing of the relay processing.

(4) Step S14

The controller 60 determines whether or not the event is completion of the hand-off processing.

(5) Step S15

When the event is the completion of the hand-off processing, the controller 60 sets a flow entry for each of the switches 10 on the determined route in the initialization processing of the relay processing. The flow entry shows flow information of the first and second TCP connections. The information of the first TCP connection is set to the switch 10 between the client terminal 100 and the relay unit 30. The information of the second TCP connection is set to the switch 10 between the relay unit 30 and the server 200.

(6) Step S16

The controller 60 determines whether or not the event is completion of flow entry setting.

(7) Step S17

When the event is the flow entry setting completion, if the controller 60 has received a packet of the TCP connection subjected to the stop setting in the initialization processing of the relay processing, the controller 60 transmits the packet to the relay unit 30. At this time, in order to transmit the packet of the TCP connection subjected to the stop setting to the relay unit 30, the transmission processing of the packet from the controller 60 to the switch 10 is performed and the flow entries are referred to in the packet transmission processing. Thus, the packet transmission processing to the relay unit 30 can be realized.

(8) Step S18

The controller 60 transmits a relay start request to the relay unit 30 at the same time with the packet transmission or immediately after the packet transmission.

(9) Step S19

The controller 60 determines whether or not an event is a session end notice.

(10) Step S20

The controller 60 deletes the first and second TCP connection information managed for the relay processing from a management table when the event is the session end notice.

Figure 6B:
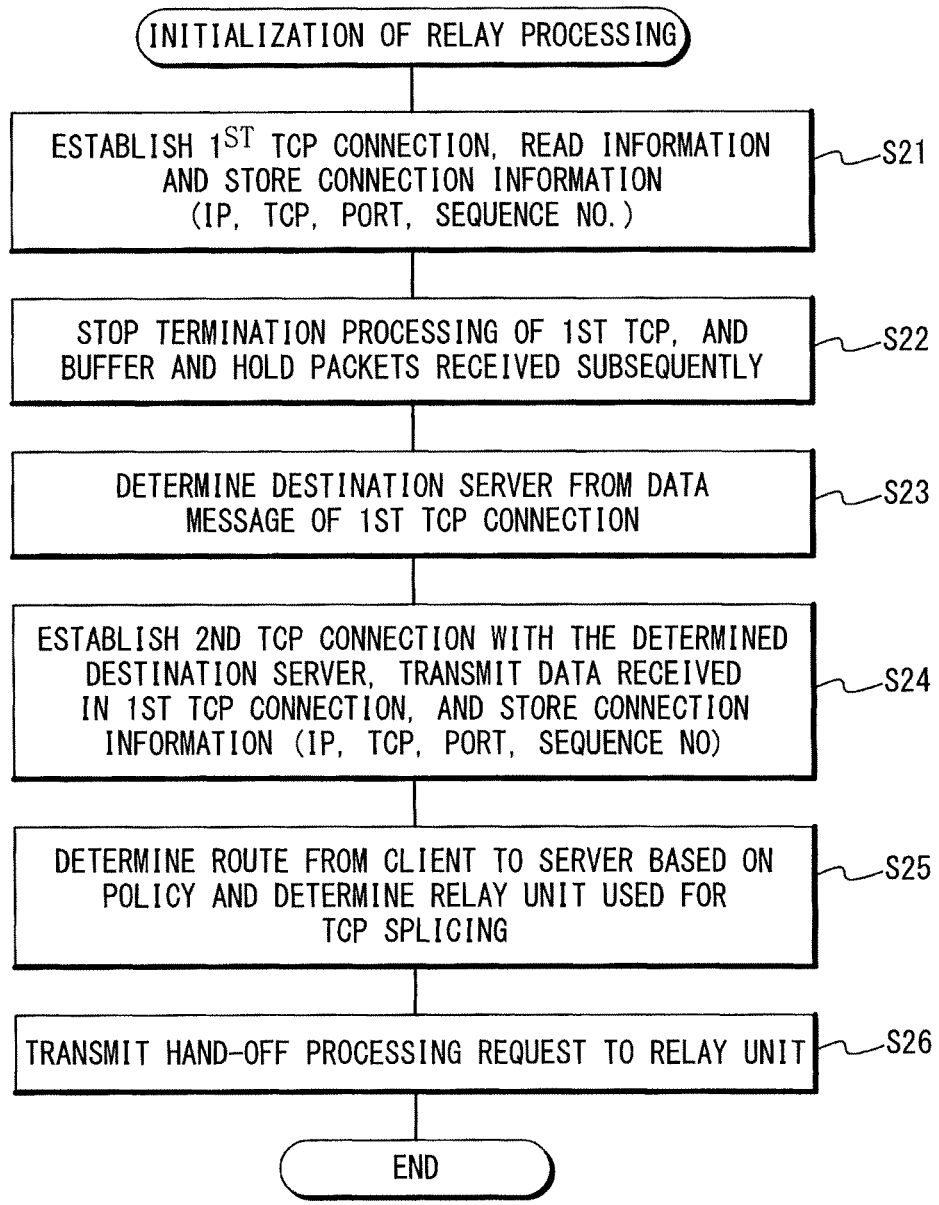
FIG. 6B is a flow chart showing processing of a controller according to the first exemplary embodiment of the present invention.

Referring to FIG. 6B, the details of the initialization processing of the relay processing will be described.

(1) Step S21

In the initialization processing of the relay processing, the control interface 61 of the controller 60 reads data from the client terminal 100, after establishing the first TCP connection with the client terminals 100. Moreover, the controller 60 reads the connection information (an IP destination address, an IP source address, a TCP destination port number, a TCP source port number, an initial value of sequence number) of the first TCP connection from the TCP protocol stack.

(2) Step S22

When having read the data from the client terminal 100, the control interface 61 of the controller 60 stops termination processing of the first TCP connection, and buffers packets which are received subsequently on the same TCP connection just as they are.

(3) Step S23

The relay control section 62 of the controller 60 checks the read data, compares it with a setting policy and determines the server 200 as a connection destination.

(4) Step S24

The control interface 61 of the controller 60 establishes the second TCP connection with the determined server 200 (server 200 as the connection destination). At this time, the controller 60 reads the connection information of the second TCP connection from the TCP protocol stack. As an example of the connection information of the second TCP connection, an IP destination address, the IP source address, the TCP destination port number, the TCP source port number, an initial value of sequence number and so on are exemplified. Moreover, the controller 60 transmits the data read from the client terminal 100 by using the first TCP connection to the server 200 as the connection destination in the second TCP connection.

(5) Step S25

The routing control section 63 of the controller 60 calculates the route from the client terminal 100 as the connection source to the server 200 as the connection destination and selects one of the relay units 30 on the route. As a method of selecting the relay unit 30, a method of selecting the relay unit 30 nearest to the server 200, a method of selecting the relay unit 30 which is nearest to the client terminal 100, and a method of selecting the relay unit 30 which has the largest margin in the number of relay possible connections are exemplified.

(6) Step S26

The relay control section 62 of the controller 60 transmits a hand-off request to the selected relay unit 30 based on the first and second TCP connection information. As an example of the first and second connection information, an IP address of the client terminal 100, an IP address of the controller 60, an IP address of the server 200, a port number of the TCP connection, a difference value of sequence number and a difference value of ACK number are exemplified. The difference value of sequence number and the difference value of ACK number are found from the initial value of sequence number. The controller 60 transmits the connection information to the determined relay unit 30 as the hand-off request. The controller 60 completes the hand-off processing after transmitting the hand-off request.

As a specific method of handling the flow table 12 in the switch 10 from the controller 60, "Openflow" (http://www.openflowthe switch.org/), and "GMPLS" (Generalized Multi-Protocol Label Switching), "MIB+VLAN" (Management Information Base+Virtual LAN) and so on are exemplified.

In case of the "Openflow", the control interface 61 of the controller 60 corresponds to "Openflow Controller". The control line 50 and an interface of the switch control section 13 for the controller 60 corresponds to "Secure Channel". In case of the "GMPLS", the controller 60 corresponds to "MIB". The switch 10 corresponds to the "GMPLS switch". The switch control section 13 corresponds to a table control section in the "GMPLS switch". Also, the controller 60 can handle "ULAN setting" of the switch 10, by using "Management Information Base (MIB) interface" of the switch 10.

The present exemplary embodiment can be applied even if an interface between the control interface 61 of the controller 60 and the switch control section 13 of the switch 10 is compatible to any of "Openflow", "GMPLS", and "MIB+VLAN".

Second Exemplary Embodiment

Next, a second exemplary embodiment of the present invention will be described.

In the present exemplary embodiment, the relay unit 30 and the server 200 are realized as applications of virtual machines (VM) on a computer not as independent units. A plurality of virtual machines operate on the server 200 and one of these virtual machines attains a relay function. The other virtual machines attain server functions. Thus, on the server 200, the relay function and the server function are connected by an internal network of the virtual machines.

Figure 7:
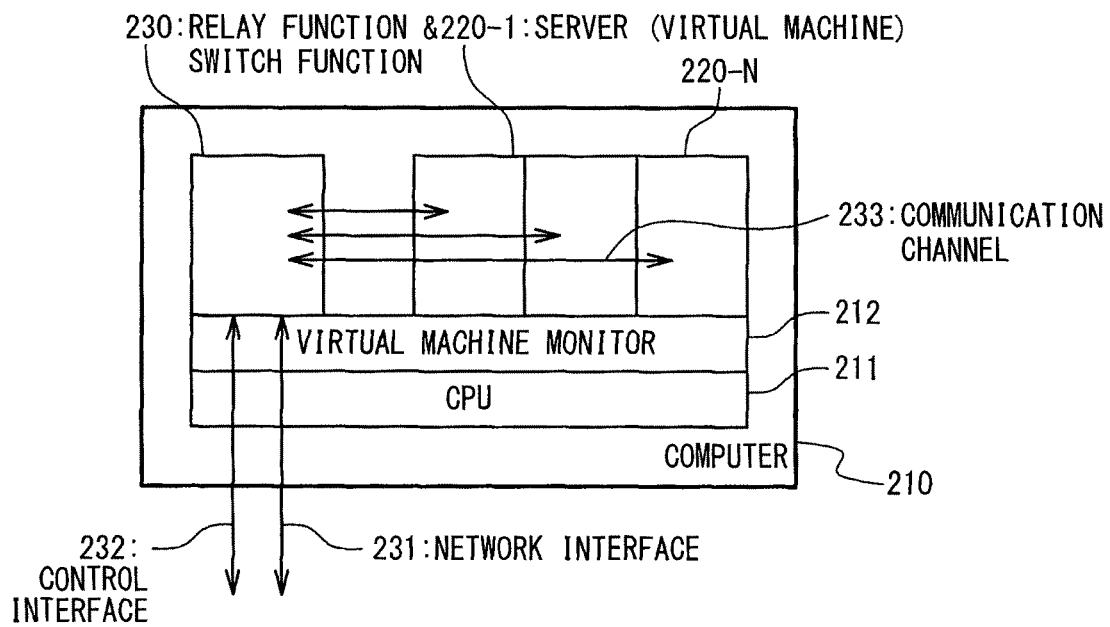
FIG. 7 is a diagram showing a configuration of the application switch system according to a second exemplary embodiment of the present invention.

Referring to FIG. 7, the server 200 is provided with a main function section 210, server function sections 220 (220-$i$, $i=1$-N) and a relay function section 230 in the present exemplary embodiment.

The main function section 210 contains a CPU 211 and a virtual machine monitor (VMM) (or Hypervisor) 212. In the main function section 210, the virtual machine monitor 212 operates on the CPU 211 and the server function sections 220-1 to 220-N, and the relay function section 230 operates thereon. In this example, the relay function section 230 has the relay function and a switch function.

Moreover, the relay function section 230 and the server function sections 220 can communicate through communication channels. The relay function section 230 has a network interface and a control interface for communication with an external section. It should be noted that the control interface and the network interface may use a physically same line.

In this configuration, the function sections corresponding to the servers 200, the switches 10, and the relay units 30 operate on a single computer, and the relay function section 230 can be made the closest to the server function section 220. When the relay unit 30 is deployed in the network as a physical unit, the conversion table 32 is on the route of the network so that the position of the conversion table 32 cannot be changed. However, in the deployment example of the present exemplary embodiment, the relay function section 230 is in physically the same position as the server function section 220, and the conversion table 32 is not deployed on the network. Therefore, the network route can be flexibly selected. Also, because the relay function section 230 is realized on the virtual machine, the relay function section 230 is deployed on the same computer as the server 200, but it is unnecessary to change an application of the server 200 and a protocol stack of the server 200. Accordingly, the effect of improving portability can be attained.

First Example

Figure 8:
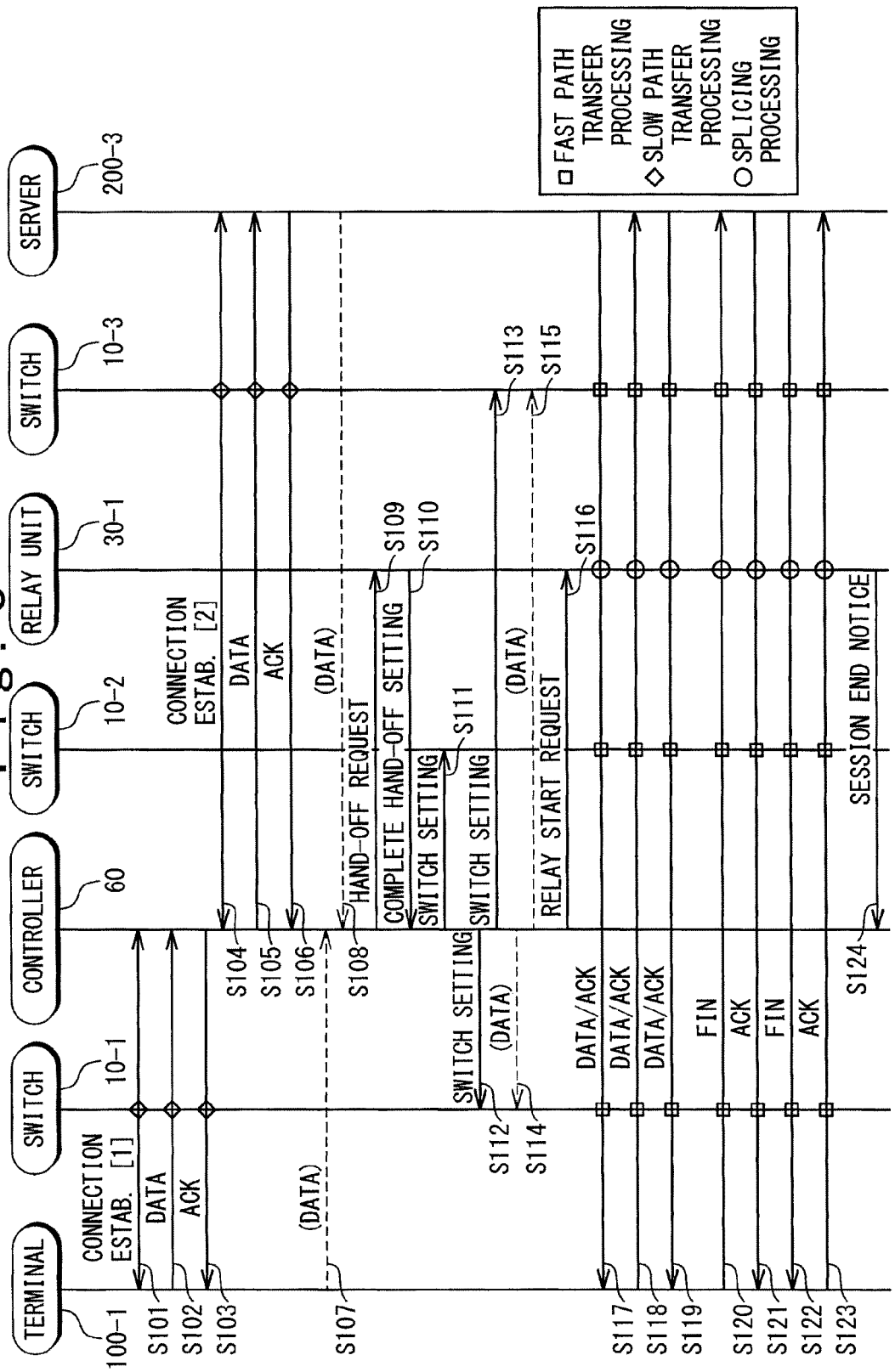
FIG. 8 is a sequence chart showing an operation of the application switch system in a first example.

Referring to FIG. 8, a connection from the client terminal 100-1 to the server 200-3 in FIG. 2 will be described.

(1) Step S101

The client terminal 100-1 issues a TCP connection request for receiving a service provided from the server 200. At this time, the initial state of the switch 10-1 is in the state of no flow entry. Therefore, miss hit occurs in the search of flow entries, and data indicating the miss hit is sent to the controller 60. Also, the controller 60 can communicate with the client terminal 100-1 through the switch 10-1. In the TCP connection request, the connection is established through a sequence called "3-way handshake".

(2) Step S102

When the connection is established, the client terminal 100-1 transmits request data to the controller 60.

(3) Step S103

When receiving a data segment correctly, the controller 60 performs the TCP protocol processing on the data and returns an ACK for the position corresponding to a sequence number of the received data.

(4) Step S104

The controller 60 checks the request data and selects one to be connected, of the servers 200 based on the request data. For example, in case of HTTP, the controller 60 determines one to be connected, of the servers 200 by comparing URI (Uniform Resource Identifier) contained in a GET message with a policy database contained in the relay control section 62, and selects the server 200 based on the determination result. In this example, the controller 60 selects the server 200-3 and establishes a second TCP session with the server 200-3.

(5) Step S105

The controller 60 transmits to the server 200-3, the request data which has been received from the client terminal 100-1. At this time, the controller 60 transmits the data through the switch 10-3 as an edge to which the selected server 200-3 is connected.

(6) Step S106

The server 200-3 notifies normal reception by returning the ACK packet for the request data. At this time, the server 200-3 transmits the return packet to the controller 60 by using the control line which is used in case of miss hit on flow entry search in the switch 10-3.

(7) Step S107

The controller 60 stops TCP termination processing, when receiving the ACK from the server 200-3, and retains a packet in the buffer as it is, when data is received from the client terminal 100-1.

(8) Step S108

Similarly, the controller 60 stops the TCP termination processing, when receiving the ACK from the server 200-3, and retains the packet in the buffer as it is, when data is received from the server 200-3.

(9) Step S109

Next, the controller 60 inquires to the routing control section 63, a route from the client terminal 100-1 to the server 200-3, and determines the relay unit 30 which performs the TCP splicing. In FIG. 2, it is supposed that the controller 60 selects an access from the client terminal 100-1 to the server 200-3, and acquires data of the switch 10-1, the switch 10-2, the relay unit 30-1, and the switch 10-3 on the route. In this example, the controller 60 determines that the relay unit 30-1 is used. The controller 60 transmits the hand-off request for the TCP splicing to the relay unit 30-1. The information of the first and second TCP connections is contained in the hand-off request. Specifically, in order to specify the TCP session, data are contained such as IP addresses (destination, source), TCP port numbers (destination, source), and difference values of initial sequence number in the first and second TCP connections. As for difference values of sequence numbers, there are two kinds of values from the client terminal 100-1 to the server 200-3 and from the server 200-3 to the client terminal 100-1.

(10) Step S110

When receiving the hand-off request, the relay unit 30-1 registers a parameter contained in the request on the conversion table 32. The parameter is registered on the conversion table 32 by using the header data as a key. The relay unit 30-1 registers two kinds of conversion rules for a direction from the client terminal 100-1 to the server 200-3 and for a direction from the server 200-3 to the client terminal 100-1 on the conversion table 32. An example is shown in FIG. 5. In this example, the first TCP connection is between IP address "10.2.1.1" of the client terminal 100-1 and the IP address "10.1.1.1" of the controller 60. The TCP destination port number is "80". The TCP source port number is "1500". The second TCP connection is between the IP address "10.1.0.2" of the server 200-3 and the IP address of the controller 60. The TCP destination port number is "80". The TCP source port number is "2000". Also, the relay unit 30-1 registers in the conversion table 32, a rule of addition of "−4000" to a value of a sequence number and a rule of addition of "+2000" to a value of ACK number, for the conversion from the first TCP connection to the second TCP connection in the direction from the client terminal 100-1 to the server 200-3. It should be noted that if the destination and the source of each of the address and the port number are exchanged based on the direction in the search, the entry of the table may be of one kind. When the registration into the conversion table 32 is completed, the relay unit 30-1 transmits a completion notice to the controller 60.

(11) Step S111

The controller 60 registers a flow entry on the switch 10 on the route from the client terminal 100-1 to the server 200-3. The flow entry is used to determine which of ports a packet should be outputted to, by using the header data of the packet as a key. In this example, the controller 60 sets the flow entry to the switch 10-2 so as to transfer the packet onto the first TCP connection.

(12) Step S112

In the same way, the controller 60 sets the flow entry to the switch 10-1 so as to transfer the packet onto the first TCP connection.

(13) Step S113

The controller 60 sets the flow entry to the switch 10-3 so as to transfer the packet onto a second TCP connection.

(14) Step S114

When the subsequent data have been retained by the controller 60 at the time of completion of the registration of the flow entry after the establishment of the first and second TCP connections, the controller 60 transfers the subsequent data to the switch 10-1 in accordance with the flow entry.

(15) Step S115

In the same way, the controller 60 transfers the subsequent data to the switch 10-3 in accordance with the flow entry.

(16) Step S116

Next, the controller 60 issues a relay start request to the relay unit 30-1.

(17) Step S117

The relay unit 30-1 starts TCP splicing on the specified TCP connection in response to the relay start request. Since then, the relay unit 30-1 relays the transfer data between the client terminal 100-1 and the server 200-3 through the TCP splicing. Specifically, the relay unit 30-1 performs the conversion of the IP address, the TCP port number, the sequence number, and the ACK number. The relay unit 30-1 adds the difference values registered in the conversion table to the sequence number and the ACK number. When the conversion of the header data ends, the relay unit 30-1 recalculates and corrects the TCP sequence number. In this example, the server 200-3 transfers the data to the client terminal 100-1 through the relay unit 30-1 and receives an ACK from the client terminal 100-1.

(18) Step S118

Also, the client terminal 100-1 transfers data to the server 200-3 through the relay unit 30-1 and receives an ACK from the server 200-3.

(19) Step S119

Moreover, the server 200-3 transfers data to the client terminal 100-1 through the relay unit 30-1 and receives the ACK from the client terminal 100-1.

(20) Step S120

When being executing the TCP splicing, the relay unit 30-1 monitors a FIN flag contained in the TCP header and determines the end of the connection. Specifically, the relay unit 30-1 determines that the TCP connection state is ended, when receiving a FIN flag and the ACK corresponding to the FIN flag in each of the two directions, and deletes the conversion table 32 and notifies a session end to the controller 60. In this example, the client terminal 100-1 transmits the FIN flag to the server 200-3 through the relay unit 30-1.

(21) Step S121

Next, the server 200-3 returns an ACK to the client terminal 100-1 through the relay unit 30-1.

(22) Step S122

Moreover, the server 200-3 transmits a FIN flag to the client terminal 100-1 through the relay unit 30-1.

(23) Step S123

The client terminal 100-1 returns an ACK to the server 200-3 through the relay unit 30-1.

(24) Step S124

When it is determined that the connection is ended, the relay unit 30-1 notifies the session end to the controller 60.

Second Example

Figure 9:
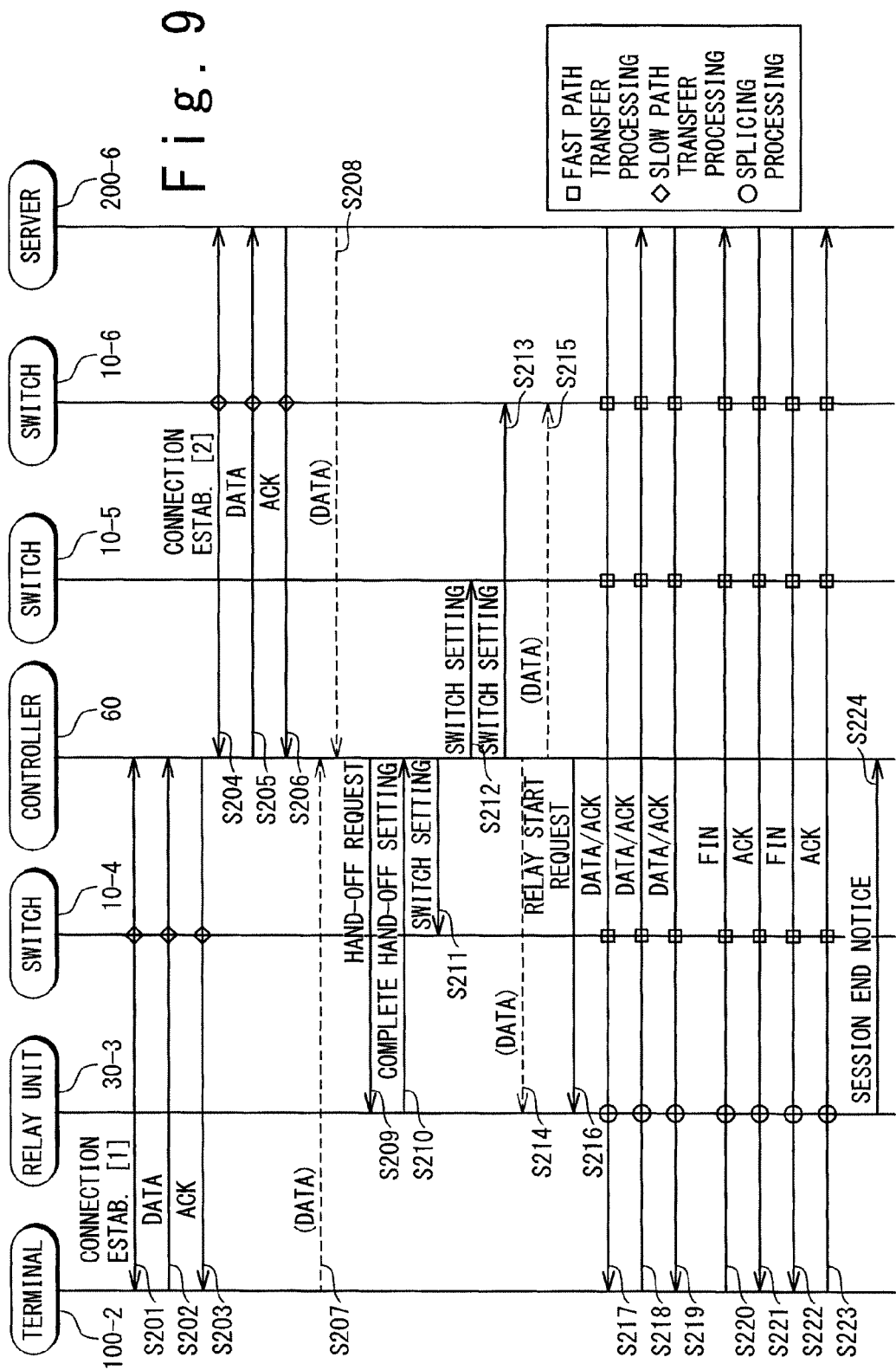
FIG. 9 is a sequence chart showing the operation of the application switch system in a second example.

Referring to FIG. 9, the connection from the client terminal 100-2 to the server 200-6 in FIG. 2 will be described. In this example, the relay position is on the side of the client terminal.

In this case, the route which is looked for by the controller 60 is in an order of the relay unit 30-3, the switch 10-4, the switch 10-5, and the switch 10-6. The relay unit 30 on the route is only the relay unit 30-3 which is nearest to the client terminal 100. In this example, the relay unit 30-3 is used for the TCP splicing.

It should be noted that in case of the configuration in the second example, the data of connection establishment is first transferred to the switch 10-4 through the relay unit 30-3 and then is transferred from the switch 10-4 to the controller 60. Therefore, the relay unit 30-3 and the switch 10-4 pass a packet without discarding and doing anything in case of a miss hit in the conversion table 32.

Most of the step S201 to the step S224 is same as the step S101 to step S124 in FIG. 8. The different point is the step S214. In the step S214, when retaining a packet from the client terminal 100-2 which belongs to the first TCP connection, the controller 60 has a function to insert into not the switch 10-4 but the relay unit 30-3 and to transmit to the switch 10-4 after the TCP splicing, for the conversion of the header data of the packet.

(1) Step S201

The client terminal 100-2 issues a TCP connection request in order to receive the service provided by the server 200. At this time, the initial state of the switch 10-4 is in the state of no flow entry. Therefore, a miss hit occurs in the search of the flow table and then data is sent to the controller 60. Also, the controller 60 can communicate with the client terminal 100-2 through the switch 10-4.

(2) Step S202

When the TCP connection is established, the client terminal 100-2 transmits request data to the controller 60.

(3) Step S203

When receiving a data segment correctly, the controller 60 performs the TCP protocol processing and returns an ACK about a position indicating the sequence number of the received data.

(4) Step S204

The controller 60 checks the content of the request data and selects the server 200 to be connected based on the content. In this example, the controller 60 selects the server 200-6 and establishes a second TCP session for the selected server 200-6.

(5) Step S205

The controller 60 transmits the request data received from the client terminal 100-2 and retained, to the server 200-6. At this time, the controller 60 transmits the data through the switch 10-6 as an edge to which the selected server 200-6 is connected.

(6) Step S206

The server 200-6 notifies normal reception by returning an ACK to the request data. At this time, the server 200-6 searches the switch 10-6 for a flow entry, and uses the control line to send a return packet to the controller 60 in case of a miss hit.

(7) Step S207

The controller 60 stops the TCP termination processing when receiving the ACK from the server 200-6, and retains a packet in a buffer as it is, when receiving data from the client terminal 100-2.

(8) Step S208

In the same way, the controller 60 stops the TCP termination processing when receiving the ACK from the server 200-6, and retains a packet in the buffer as it is, when receiving data from the server 200-6.

(9) Step S209

Next, the controller 60 inquires a route from the client terminal 100-2 to the server 200-6 to the routing control section 63, and determines the relay unit 30 which performs the TCP splicing. In this example, the controller 60 determines that the relay unit 30-3 is used. The controller 60 transmits a hand-off request for the TCP splicing to the relay unit 30-3. Information of the first and second TCP connections is contained in the hand-off request. Specifically, the IP address (destination, source), the TCP port number (destination, source), the difference values of initial sequence numbers in the first and the second TCP connection are contained so as to specify a TCP session. There are two kinds of the difference values of sequence numbers for a direction from the client terminal 100-2 to the server 200-6 and a direction from the server 200-6 to the client terminal 100-2.

(10) Step S210

When receiving the hand-off request, the relay unit 30-3 registers a parameter contained in the request on the conversion table 32. The parameter is registered on the conversion table 32 by using the header data as a key. The relay unit 30-3 registers on the conversion table 32, two kinds of the conversion rules for the direction from the client terminal 100-2 to the server 200-6 and the direction from the server 200-6 to the client terminal 100-2. When the registration onto the conversion table 32 completes, the relay unit 30-3 transmits a completion notice to the controller 60.

(11) Step S211

The controller 60 registers a flow entry on the switch 10 on the route from the client terminal 100-2 to the server 200-6. In this example, the controller 60 sets to the switch 10-4, the flow entry for transferring a packet on the first TCP connection.

(12) Step S212

In the same way, the controller 60 sets to the switch 10-5, a flow entry for transferring the packet on the first TCP connection.

(13) Step S213

The controller 60 sets to the switch 10-6, the flow entry for transferring the packet on the second TCP connection.

(14) Step S214

When the subsequent data on the first and second TCP connections have been retained by the controller 60 at a time of completion of the registration of the flow entry, the controller 60 transfers the subsequent data to the relay unit 30-3 in accordance with the flow entry.

(15) Step S215

In the same way, the controller 60 transfers the subsequent data to the switch 10-6 in accordance with the flow entry.

(16) Step S216

Next, the controller 60 sends a relay start request to the relay unit 30-3.

(17) Step S217

The relay unit 30-3 starts the TCP splicing on the specified TCP connection in response to the relay start request. Since then, the relay unit 30-3 relays transfer data between the client terminal 100-2 and the server 200-6 through the TCP splicing. Specifically, the relay unit 30-3 performs the conversion of the IP addresses, the TCP port numbers and the conversion of the sequence numbers and the ACK numbers. The relay unit 30-3 adds the difference values in described the table to the sequence number and the ACK number. The relay unit 30-3 re-calculates and corrects the TCP sequence number after the conversion of the header data is ended. In this example, the server 200-6 transfers data to the client terminal 100-2 through the relay unit 30-3 and receives an ACK from the client terminal 100-2.

(18) Step S218

Also, the client terminal 100-2 transfers data to the server 200-6 through the relay unit 30-3 and receives an ACK from the server 200-6.

(19) Step S219

Moreover, the server 200-6 transfers data to the client terminal 100-2 through the relay unit 30-3 and receives an ACK from the client terminal 100-2.

(20) Step S220

When being executing TCP splicing, the relay unit 30-3 monitors the FIN flag contained in the TCP header and determines the end of the connection. Specifically, the relay unit 30-3 determines that the TCP condition is ended when receiving the FIN flag and the ACK corresponding to it with respect to each of two directions. Then, the relay unit 30-3 deletes the conversion table 32 and notifies a session end to the controller 60. In this example, the client terminal 100-2 transmits a FIN flag to the server 200-6 through the relay unit 30-3.

(21) Step S221

Next, the server 200-6 returns an ACK to the client terminal 100-2 through the relay unit 30-3.

(22) Step S222

Moreover, the server 200-6 transmits a FIN flag to the client terminal 100-2 through the relay unit 30-3.

(23) Step S223

The client terminal 100-2 returns an ACK to the server 200-6 through the relay unit 30-3.

(24) Step S224

When determining that the connection is ended, the relay unit 30-3 notifies a session end to the controller 60.

Third Exemplary Embodiment

Below, a third exemplary embodiment of the present invention will be described.

In the present exemplary embodiment, the TCP splicing is not performed on a selected relay unit after two TCP connections are established by the controller, but the controller selects one of the relay units which have an application switch function without performing termination of the TCP connection, such that the relay processing is performed by use of the switch function of the selected relay unit.

Figure 10:
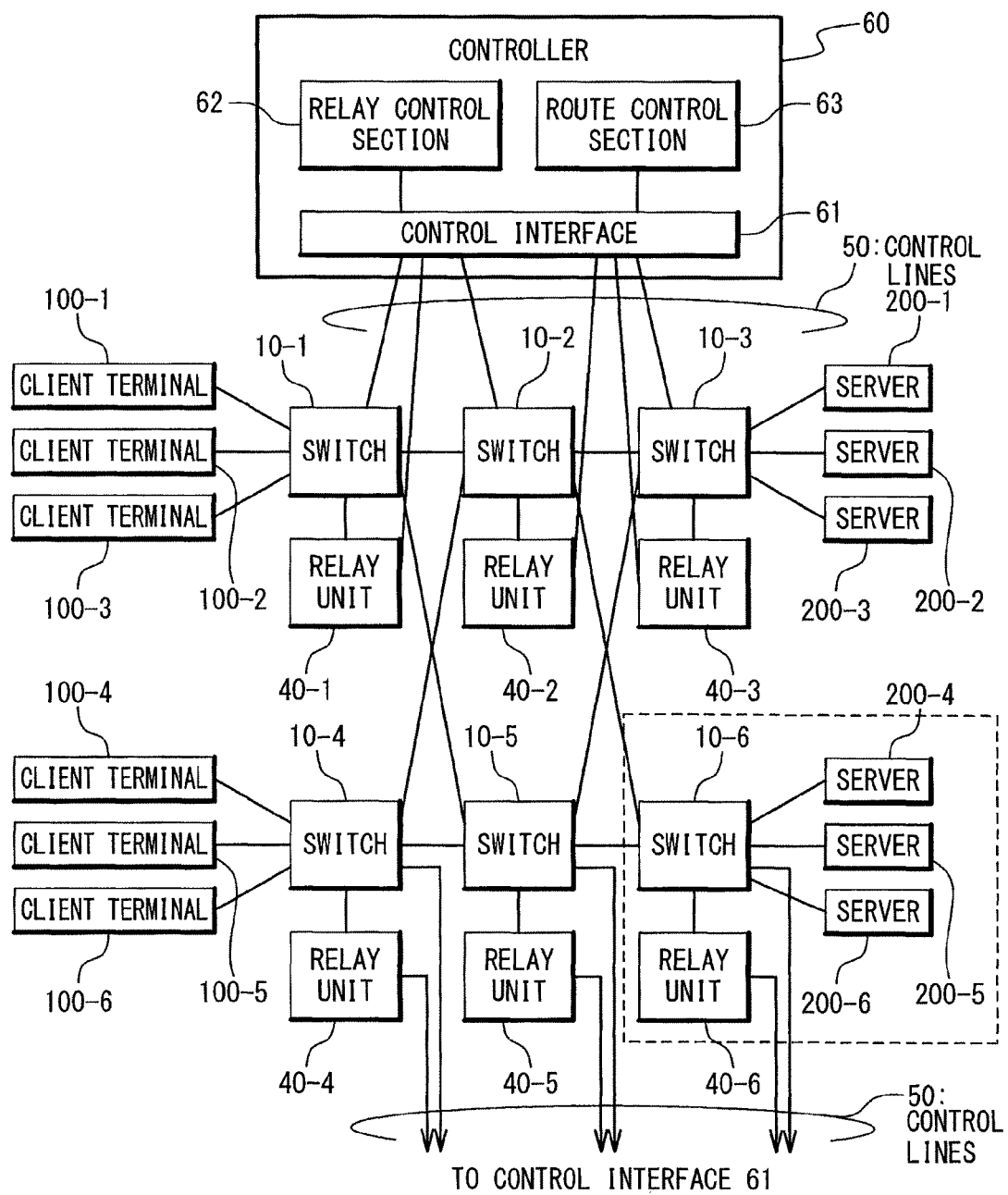
FIG. 10 is a diagram showing a configuration of the application switch system according to a third exemplary embodiment of the present invention.

As shown in FIG. 10, in the present exemplary embodiment, the application switch system of the present invention is provided with client terminals 100 (100-$i$, $i$=1 to N, N is an optional integer), switches 10 (10-$i$, $i$=1 to N), relay units 40 (40-$i$, $i$=1 to N), a control line 50, a controller 60 and servers 200 (200-$i$, $i$=1 to N).

The relay unit 40 is connected with the switch 10. It should be noted that the switches 10 and the relay units 40 do not always have 1-to-1 correspondence. For example, there are a case that no relay unit 40 is connected with the switch 10 and a case that the relay units 40 are connected with one switch.

Figure 11:
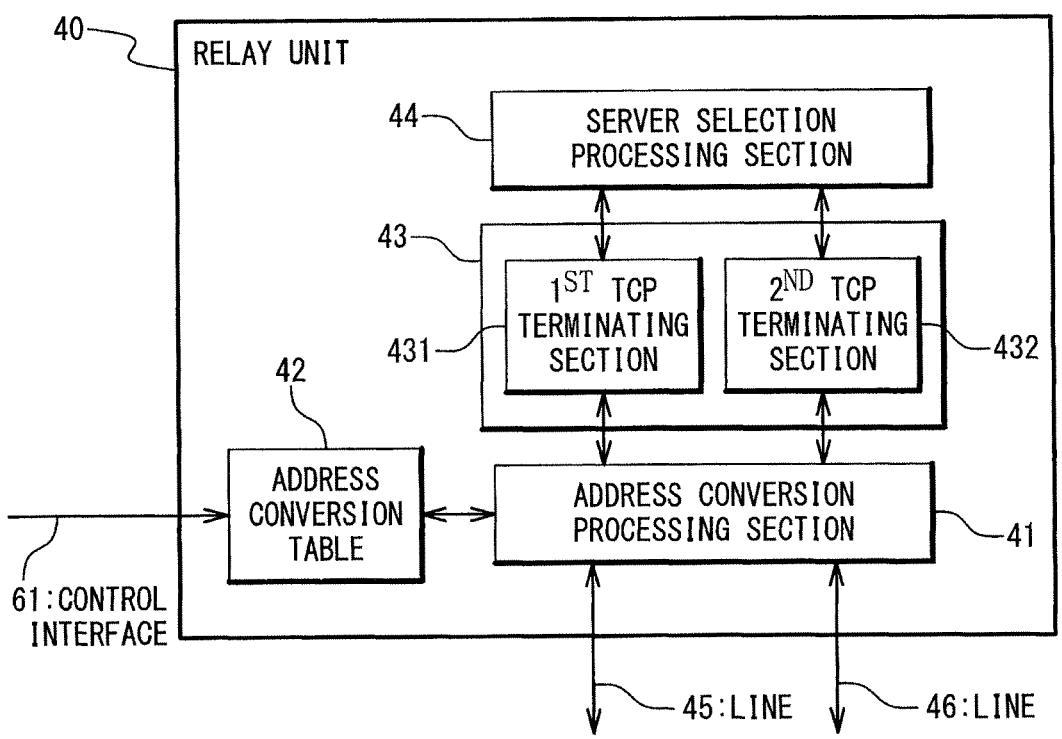
FIG. 11 is a diagram showing a configuration of the relay unit according to the third exemplary embodiment of the present invention.

The configuration example of the relay unit 40 is shown in FIG. 11. The relay unit 40 is provided with an address conversion processing section 41, an address conversion table 42, a TCP terminating section 43, a server selection processing section 44, a line 45 and a line 46.

The address conversion processing section 41 refers to the address conversion table 42 according to necessity, to perform the address conversion on a header of each of packets transmitted and received to and from an external unit through two TCP lines corresponding to the line 45 and the line 46. In this example, the address conversion processing section 41 is connected with the controller 60 through the control interface 61. When the relay unit 40 is selected, the address conversion processing section 41 receives a packet having a virtual address which indicates a plurality of servers (servers 200) as a destination address from the client (client terminal 100) through the two TCP lines corresponding to the line 45 and the line 46. The address conversion processing section 41 receives the packet having the destination address and converts the destination address of the packet into the addresses receivable by the relay unit 40 such that the TCP termination processing can be performed.

The address conversion table 42 retains conversion information for the address conversion. The address conversion table 42 may be registered on the relay unit 40 in advance. Also, the address conversion table 42 may be set when the relay unit 40 is selected.

TCP terminating section 43 terminates the two TCP lines corresponding to the line 45 and the line 46 and takes out a payload signal (communication message in an application layer). In this example, the TCP terminating section 43 contains a first TCP terminating section 431 and a second TCP terminating section 432.

The server selection processing section 44 switches based on the content of the message taken out by TCP terminating section 43. For example, the server selection processing section 44 determines one connection destination server from among a plurality of server candidates based on key words such as URI (Unified Resource Identifier) contained in the message and Cookie, information of a character string, and load data of the server.

The line 45 and line 46 are logical lines for connecting between the relay unit 40 and an external unit.

It should be noted that the server, the switch, and the relay processing section may be configured as the virtual machines on an identical computer, as shown in FIG. 7 of the second exemplary embodiment. In this case, for example, the switch 10-6, the relay unit 40-6, the server 200-4, the server 200-5, the server 200-6 of FIG. 10 are realized as the virtual switch, the virtual relay unit, and the virtual servers on the virtual machine monitor on the identical computer.

Third Example

Referring to FIG. 12, the connection from the client terminal to the server will be described.

In this example, it is supposed that the four servers of the server 200-1, the server 200-2, the server 200-4, and the server 200-5 are destination servers. Also, it is supposed that an address virtually showing these four servers is "VIP1".

(1) Step S301

The client terminal 100-1 starts communication for "VIP1".

(2) Step S302

When receiving a packet from the client terminal 100-1, the switch 10-1 refers to the flow table 12 and transmits the packet to the controller 60 through the control line 50 when the packet does not hit any flow entry.

(3) Step S303

When recognizing that the destination of the packet is "VIP1", the controller 60 searches the server corresponding to "VIP1". When acquiring that the corresponding servers are four of the server 200-1, the server 200-2, the server 200-4, and the server 200-5, the controller 60 determines routes from the client terminal 100-$i$ to these four servers, by referring to topology information.

At this time, the controller 60 defines as a common route, the same route through which the connections to all the servers pass, and looks for the relay unit which is connected with the switches on the common route. In this example, the route which passes through the switch 10-1 and the switch 10-2 or the route which passes through the switch 10-1 and the switch 10-5 is the common route. It should be noted that the controller 60 can reach the server 200-1 and the server 200-2 through the switch 10-3. Also, the controller 60 can reach the server 200-4 and the server 200-5 through the switch 10-6. However, it is assumed that these are not on the common route. Therefore, the relay unit which is connected with the switch on the common route is three of the relay units 40-1, the relay units 40-2, and the relay units 40-5.

(4) Step S304

Next, the controller 60 selects one from among three of the relay unit 40-1, the relay unit 40-2, and the relay unit 40-5. As a method of selecting, the loads of three relay units are monitored previously and the relay unit having the lowest load is selected. Also, the number of connections on processing is measured previously and the relay unit having the smallest number of connections is selected. The controller 60 selects one relay unit from among the candidates in this way. In this example, it is supposed that the relay unit 40-2 is selected as an example. In this case, a possible common route is the route which passes through the switch 10-1 and the switch 10-2.

(5) Step S305

In order to set a communication route from the client terminal 100-1 to the relay unit 40-2, the controller 60 sets a flow entry to the switch 10-1 and the switch 10-2 between the client terminal 100-1 and the relay units 40-2.

The flow entry is transmitted from the client terminal 100-1 to have "VIP1" as a destination and is based on the header data of the packet transferred to the controller 60. In this example, the flow entry is based on MAC addresses and IP addresses of the source and the destination and the header data of layer 4 and is set to the flow table 12 in each switch. As an example of the header data of layer 4, the port numbers of TCP and UDP (User Datagram Protocol) are considered.

Also, although being not illustrated in a sequence chart of FIG. 12, the controller 60 sets the address conversion table 42 of the relay unit 40-2 so as to allow the reception of the packet having "VIP1" as the destination. Supposing that the relay unit 40-2 has is IP-40-2, the controller 60 sets the address conversion table 42 through the control interface 61 so as to convert the destination from "VIP1" into "IP-40-2".

(6) Step S306

The controller 60 transmits the packet transferred from the switch 10-1 to the switch 10-1 or the switch 10-2. FIG. 12 shows a case that a packet is transmitted from the controller 60 to the switch 10-1.

(7) Step S307

The switch 10-1 transfers the packet transferred from the controller 60 to the switch 10-2 in accordance with the flow entry. The switch 10-2 transfers the packet to the relay unit 40-2.

(8) Step S308

When receiving the packet, the relay unit 40-2 starts a communication with the client terminal 100-1 by "Fast Path" transfer. Since then, "Fast Path" transfer communication is performed between the client terminal 100-1 and the relay unit 40-2.

(9) Step S309

The relay unit 40-2 terminates the layer 4 and determines the switching destination based on the message data. An example of the protocol of layer 4 includes TCP and UDP. In this example, the switching destination is either of the server 200-1, the server 200-2, the server 200-4, and the server 200-5. Data indicating correspondence relation between "VIP1" and these four servers is set in the inside of the relay unit 40-2 previously or is notified from the controller 60 to the relay unit 40-2 previously prior to the switch determination. Thus, the relay unit 40-2 selects an appropriate destination server. As a method of selecting the destination server based on the message data, there is a method of selecting it based on a key word, a selection policy and load data of the server, as known in an application load distribution apparatus. It is supposed that the relay unit 40-2 selects the server 200-5 as the destination server. The relay unit 40-2 issues a new connection request as a packet. The relay unit 40-2 sends the packet to the switch 10-2.

Also, the destination of the packet of the connection request is the server 200-5 and the source address is the address (IP-40-2) of the relay unit 40-2. In this example, the address conversion processing section 41 can convert the source address into an address of the client, according to necessity. In this case, the server selection processing section 44 rewrites the source address of a packet transferred from the second TCP terminating section 432 to the address of the client terminal 100-1, by registering address information of the client acquired by the first TCP terminating section 431 on the address conversion table.

(10) Step S310

When receiving the packet, the switch 10-2 transfers it to the controller 60. The controller 60 sets a transfer route from the relay unit 40-2 to the server 200-5. Specifically, the controller 60 calculates the route from the relay unit 40-2 to the server 200-5 and sets a flow entry to the switches on the route.

(11) Step S311

In this example, it is supposed that the controller 60 selects a route which passes through the switch 10-2 and the switch 10-6. The controller 60 sets the flow entry to each of the switches (the switch 10-2 and the switch 10-6).

(12) Step S312

Moreover, the controller 60 transmits the retained packets to the switch 10-2 or the switch 10-3. In this example, the controller 60 transmits the retained packet to the switch 10-2.

(13) Step S313

The switch 10-2 transfers the received packet to the server 200-5 through the switch 10-6 in response to the flow entry.

(14) Step S314

The server 200-5 receives the transmitted packet. Thus, the relay unit 40-2 sets a transfer route with the servers 200-5, relays a request from the client terminal 100-1, and performs processing of an application with the server 200-5.

As described above, the relay processing to a group of servers indicated with "VIP1" from the client terminal 100-1 can be realized.

In the above, a case that a virtual address is "VIP1", and the server 200-1, the server 200-2, the server 200-4, and the server 200-5 are contained in "VIP1" as the destination has been described. It is possible to have a plurality of pieces of information which indicates correspondence relation between the virtual address and the server group. For example, if a virtual address is "VIP2", it would be sufficient that the selected relay unit 40 sets the address conversion table 42 to allow the packet for "VIP2" to be subjected to reception processing, and registers the correspondence between "VIP2" and the servers on the server selection processing section 44 previously. In this method, the application switch processing corresponding to a plurality of virtual addresses can be performed by the relay unit selected from the plurality of the relay units.

An application switch system of the present invention which performs connection control between a plurality of client terminals and a plurality of servers, is provided with at least one switch, at least one relay unit configured to relay a protocol, and a controller. The switch is an application switch. The controller is provided with a section configured to perform a centralized control on a route table for determining a destination in the switch, a section configured to control relay processing of the relay unit, a section configured to select a connection destination server, a section configured to select a route containing the relay unit and linking a client and the selected server, and to set the selected route to the route table in the switch, and a section configured to set to the relay unit, the relay data which is necessary when the relay unit performs the protocol relay.

Also, another application switch system of the present invention is provided with a switch configured to control connections between a plurality of client terminals and a plurality of servers on a network, a relay unit configured to perform protocol relay, and a controller. The controller is provided with a section configured to perform a centralized control on a route table for determining a destination in the switch, a section configured to control relay processing of the relay unit, a section configured to select at least one server from the plurality of the servers based on the destination address of a packet transferred from the selected client terminal, to select a network route linking between the at least one selected server and the one client terminal of the plurality of client terminals, and containing the relay unit, and to set the selected route to a route table in the switch, and a section configured to set to the relay unit, relay data used when the relay unit performs a protocol relay.

When the plurality of relay units exist, the controller selects the relay unit arranged in a position nearest to the server on the network route.

Also, when the plurality of relay units exist on the network, the controller selects the relay unit having the smallest processing load from among two relay units or more which exist on a common route from the client terminal to the plurality of servers.

Or, when the plurality of relay units exist, the controller selects the relay unit arranged in a position nearest to the client on the network route.

Or, when the protocol of a relay object is TCP (Transmission control Protocol), the controller terminates a connection from the client to take out a message, selects a connection destination server from among the plurality of servers corresponding to a destination address of a connection request based on a content of the message, issues a TCP connection request to the selected server and performs a hand-off of header conversion data which is necessary to relay two TCP connections, to the relay unit.

Or, the controller sets to the address conversion table or a filter, correspondence information of the destination address of the packet and the address of the relay unit prepares as relay information set to the relay control section and used to perform the protocol relay, such that the relay control section can perform reception processing on the packet.

The relay unit performs conversion of a TCP header of the packet to be relayed when the protocol of a relay object is TCP (Transmission control Protocol).

Also, the relay unit is provided with a TCP termination section for the packet to be relayed when the protocol of the relay object is TCP. The relay unit selects one server from among a plurality of servers based on a content of the terminated message. Moreover, the relay unit establishes a TCP connection between the relay unit and the selected server to relay a message.

Or, the relay unit operates as a program on a virtual machine which is different from a server on an identical computer to the server which operates on a virtual machine, performs protocol relay, and communicate the relay unit and the server on the identical computer.

As above mentioned, the present invention is related to the application switch system in which relay units such as an application level gateway and a proxy are distributed in a wide area, in case of data processing of network traffic (communications traffic).

In the application switch system of the present invention, by using a relay control section which performs an application distribution determination, a routing control section which performs a centralized control on a network route, and at least one relay unit deployed distributedly on the network, it is possible to select a relay position in application switch processing.

Specifically, a relay control section selects the relay unit which is nearest to the server of a distributed destination after determining an application distributed destination. Also, the routing control section sets a route to the selected relay unit and performs a hand-off to the relay unit. Thus, the optimization of the network route is performed by a distribution selection to an optional server deployed distributedly in the wide area, the selection of the optimal network route, and the selection of the relay position.

That is, in the present invention, the TCP relay processing is performed by using an optimal relay unit of the relay units deployed distributedly, to accommodate a network route efficiently, by separating the controller which performs determination of an application switch and the relay unit which performs relay processing through the TCP splicing from each other.

According to the present invention, in the application switch processing, a TCP relay node can be deployed in an optional position and optimization of the network route between the server and the client can be realized by separating a switch determination processing section and a relay position and by cooperating with the routing control processing of the network.

Also, in the application switch system of the present invention, the relay control section determines a candidacy for the application distribution destination, and selects one relay unit from among a plurality of relay units which exists on a common route to the distribution destination from the client terminal, and the routing control section sets a route a relay packet to the selected relay unit, the destination determination of a received packet is performed in the relay unit, and the application switch is performed, and thus, a switch which exists in the optimal position is selected without performing processing assignment previously on the plurality of application switch which are deployed distributedly, to realize optimization in the network route.

As described above, the exemplary embodiments of the present invention have been described in detail. However, actually, the present invention is not limited to the above-mentioned exemplary embodiments and various modifications without departing from the scope of the present invention are contained in the present invention.

It should be noted that the present application claims priorities on convention based on Japanese Patent Application No. 2009-023112 and Japanese Patent Application No. 2009-140082. The disclosures thereof are incorporated herein by reference.

What is claimed is:

1. An application switch system, comprising:
   a switch configured to control a connection between a plurality of client terminals and a plurality of servers which exist on a network;
   a relay unit configured to perform a protocol relay; and
   a controller,
   wherein said controller comprises:
   a section configured to perform a centralized control on a route table used to determine a destination in said switch;
   a section configured to control relay processing of said relay unit;
   a section configured to select one server as a connection destination from said plurality of servers;
   a section configured to select a route which links between one client terminal of said plurality of client terminals and said selected connection destination server, and which contains said relay unit, and set the selected route to the route table in said switch; and
   a section configured to set relay information used when said relay unit performs the protocol relay, to said relay unit,
   wherein, when distribution targets in the application switch system are distributed in an area, an optimal relay node is selected without going through a single relay node;
   wherein said controller further comprises a section configured to select said relay unit arranged in a position nearest to said client terminal as a connection source on said network route, when a plurality of said relay units exist on said network;
   a section configured to determine a distribution destination of an application;
   a section configured to select said relay unit arranged in a position nearest to said one server as the distribution destination of said plurality of servers and select the route which contains said selected relay unit; and
   a section configured to perform hand-off processing to said selected relay unit;
   wherein said relay unit further comprises:
   a section configured to perform a TCP (Transmission control Protocol) termination of the message to be relayed when a protocol of a relay object comprises TCP;
   a section configured to select said one server from among said plurality of servers based on a content of the message subjected to the TCP termination;
   a section configured to establish a TCP connection with said selected server; and
   a section configured to relay the message subjected to the TCP termination to said selected server; and
   wherein said plurality of servers, said switch, and said relay unit comprise virtual machines on a computer.

2. The application switch system according to claim 1, wherein said controller further comprises a section configured to select said relay unit arranged in a position nearest to said selected server as the connection destination on said network route, when a plurality of said relay units exist on said network.

3. The application switch system according to claim 1, wherein said controller further comprises:
   a section configured to select said server of at least one from among said plurality of servers based on a destination address of a packet transmitted from said one client terminal of said plurality of client terminals; and
   a section configured to select the route which links said one client terminal of said plurality of client terminals and said selected server and which contains said relay unit, and set the selected route to said route table in said switch.

4. The application switch system according to claim 3, wherein said controller further comprises:
a section configured to select said relay unit having a smallest processing load from among a plurality of relay units which exist on a common route from said one client terminal of said plurality of client terminals to said selected server, when said plurality of relay units exist on said network.

5. The application switch system according to claim 3, wherein said controller further comprises:
a section configured to terminate a connection from said client terminal to take out a message when a protocol of a relay object comprises TCP (Transmission control Protocol), and select said one server as the connection destination from among said plurality of servers corresponding to a destination address of a TCP connection request based on a content of the message; and
a section configured to issue the TCP connection request to said selected server, and perform hand-off of header conversion information used for relay of a plurality of TCP packets to said relay unit.

6. The application switch system according to claim 3, wherein said controller comprises:
an address conversion table in which correspondence data between the destination address of the packet and an address of said one relay unit is registered as the relay information used when the protocol relay is performed; and
a section configured to refer to said address conversion table when the packet is received, to convert the destination address of the received packet to the address of said relay unit.

7. The application switch system according to claim 1, wherein said relay unit comprises:
a section configured to select a TCP header of the received packet to be relayed when the protocol of a relay object comprises TCP (Transmission control Protocol).

8. A controller, comprising:
a section configured to perform a centralized control on a route table used to determine a destination in a switch;
a section configured to control relay processing of a relay unit;
a section configured to select one server as a connection destination from a plurality of servers;
a section configured to select a route which links between one client terminal of a plurality of client terminals and said selected connection destination server, and which contains said relay unit, and to set the selected route to the route table in said switch; and
a section configured to set relay information used when said relay unit performs the protocol relay, to said relay unit, wherein, when distribution targets in an application switch are distributed in an area, the controller selects an optimal relay node without going through a single relay node;
wherein said controller further comprises a section configured to select said relay unit arranged in a position nearest to said client terminal as a connection source on said network route, when a plurality of said relay units exist on said network;
a section configured to determine a distribution destination of an application;
a section configured to select said relay unit arranged in a position nearest to said one server as the distribution destination of said plurality of servers and select the route which contains said selected relay unit; and
a section configured to perform hand-off processing to said selected relay unit;
wherein said relay unit further comprises:
a section configured to perform a TCP (Transmission control Protocol) termination of the message to be relayed when a protocol of a relay object comprises TCP;
a section configured to select said one server from among said plurality of servers based on a content of the message subjected to the TCP termination;
a section configured to establish a TCP connection with said selected server; and
a section configured to relay the message subjected to the TCP termination to said selected server; and
wherein said plurality of servers, said switch, and said relay unit comprise virtual machines on a computer.

9. An application switch method, comprising:
controlling, by a switch, a connection between a plurality of client terminals and a plurality of servers which exist on a network;
performing a protocol relay by a relay unit;
performing a centralized control on a route table used to determine a destination in said switch by a controller;
controlling relay processing of said relay unit by said controller;
selecting one server as a connection destination from said plurality of servers by said controller;
selecting, by said controller, a route which links between said one client terminal of said plurality of client terminals and said selected server, and which contains said relay unit;
setting, by said controller, the selected route to a route table in said switch; and
setting, by said controller, relay information used when said relay unit performs the protocol relay, to said relay unit, wherein, when distribution targets in an application switch are distributed in an area, an optimal relay node is selected without going through a single relay node;
selecting as said selected relay unit, by said controller, said relay unit arranged in a position nearest to said one client terminal as a connection source on said network route, when said plurality of relay units exist on said network;
performing a determination of a distribution destination of an application by said controller;
selecting said relay unit arranged in a position nearest to said selected server as the distribution destination of said plurality of servers by said controller;
selecting a route which contains said selected relay unit by said controller; and performing a hand-off to said selected relay unit by said controller;
performing, by said relay unit, a TCP (Transmission control Protocol) termination of the message to be relayed when the protocol of a relay object comprises TCP;
selecting, by said relay unit, said one server from said plurality of servers based on a content of the message subjected to the TCP termination; and
establishing, by said relay unit, the TCP connection with said selected server; and
relaying, by said relay unit, the message subjected to the TCP termination to said selected server; and
wherein said plurality of servers, said switch, and said relay unit comprise virtual machines on a computer.

10. The application switch method according to claim 9, further comprising: selecting as said selected relay unit, by said controller, said relay unit arranged in a position nearest to said selected server as a connection destination on the network route, when said plurality of relay units exist on said network.

11. The application switch method according to claim 9, further comprising:
selecting said server of at least one from among said plurality of servers based on a destination address of a packet transmitted from said one client terminal of said plurality of client terminals by said controller;
selecting said route which links between said one client terminal of said plurality of client terminals and said selected server, and which contains said relay unit, by said controller; and setting the selected route to said route table in said switch.

12. The application switch method according to claim 11, further comprising:
selecting as said selected relay unit, by said controller, said relay unit having a smallest processing load from among a plurality of relay units which exist on a common route from said one client terminal of said plurality of client terminals to said selected server, when said plurality of relay units exist on said network.

13. The application switch method according to claim 11, further comprising:
performing a TCP (Transmission control Protocol) termination of a connection from said one client terminal to take out a message by said controller;
selecting said one server as a connection destination from among said plurality of servers corresponding to a destination address of a TCP connection request based on a content of the message, by said controller, when a protocol of a relay object comprises TCP (Transmission control Protocol);
issuing the TCP connection request to said selected server by said controller; and
performing a hand-off of header conversion information used for a relay of a plurality of TCP packets on said relay unit by said controller.

14. The application switch method according to claim 11, further comprising:
setting, by said controller, correspondence data of the destination address of the packet and an address of said relay unit, to an address conversion table, as the relay information used when the protocol relay is performed; and
referring to said address conversion table, by said controller, when receiving the packet, to convert the destination address of the received packet to the address of said relay unit.

15. The application switch method according to claim 9, further; comprising:
converting, by said relay unit, a TCP header of a received packet to be relayed when a protocol of a relay object comprises TCP (Transmission control Protocol).

16. The application switch method according to claim 9, further comprising:
realizing said plurality of servers, said switch and said relay unit as applications of virtual machines on a computer; and
connecting between said switch and said relay unit through an internal network of said computer.

17. A computer-readable non-transitory storage medium which stores a computer-executable program code to attain an application switch method which comprises:
making a plurality of servers, a switch, and a relay unit operate as applications of virtual machines on a computer;
controlling, by said switch, connections between a plurality of client terminals and said plurality of servers which exist on a network;
performing, by said relay unit, a protocol relay;
performing a centralized control on a route table used to determine a destination in said switch;
controlling, by a controller, relay processing of said relay unit;
selecting one server as a connection destination from said plurality of servers;
selecting a route which links between one client terminal from said plurality of client terminals and said selected server, and which contains said relay unit;
setting the selected route to a route table in said switch; and
setting relay information used when said relay unit performs the protocol relay, to said relay unit,
wherein, when distribution targets in an application switch system are distributed in an area, an optimal relay node is selected without going through a single relay node;
selecting as said selected relay unit, said relay unit arranged in a position nearest to said one client terminal as a connection source on said network route, when said plurality of relay units exist on said network;
performing a determination of a distribution destination of an application;
selecting a relay unit arranged in a position nearest to said selected server as a distribution destination of said plurality of servers;
selecting a route which contains said selected relay unit; and
performing a hand-off to said selected relay unit;
performing, by said relay unit, a TCP (Transmission control Protocol) termination of the message to be relayed when a protocol of a relay object comprises TCP;
selecting, by said relay unit, one server from said plurality of servers based on a content of the message subjected to the TCP termination; and
establishing, by said relay unit, the TCP connection with said selected server; and
relaying, by said relay unit, a message subjected to the TCP termination to said selected server.

18. The computer-readable non-transitory storage medium according to claim 17, wherein the application switch method further comprises:
selecting as said selected relay unit, said relay unit arranged in a position nearest to said server as a connection destination on the network route, when said plurality of relay units exist on said network.

19. The computer-readable non-transitory storage medium according to claim 17, wherein the application switch method further comprises:
selecting, by said controller, said selected server of at least one from among said plurality of servers based on a destination address of a packet transmitted from said one client terminal of said plurality of client terminals;
selecting, by said controller, a network route which links between said one client terminal of said plurality of client terminals and said selected server, and which contains said relay unit; and
setting the selected route to said route table in said switch.

20. The computer-readable non-transitory storage medium according to claim 19, wherein the application switch method further comprises:
selecting as said selected relay unit, by said controller, said relay unit having a smallest processing load from among a plurality of relay units which exist on a common route from said one client terminal of said plurality of client terminals to said selected server, when said plurality of relay units exist on said network.

21. The computer-readable non-transitory storage medium according to claim 19, wherein the application switch method further comprises:
  performing, by said controller, a TCP (Transmission control Protocol) termination of a connection from said one client terminal to take out a message;
  selecting, by said controller, said one server as a connection destination from among said plurality of servers corresponding to a destination address of a TCP connection request based on a content of the message, when a protocol of a relay object comprises TCP (Transmission control Protocol);
  issuing, by said controller, the TCP connection request to said selected server; and performing, by said controller, a hand-off of header conversion information used for a relay of a plurality of TCP packets on said relay unit.

22. The computer-readable non-transitory storage medium according to claim 19, wherein the application switch method further comprises:
  setting, by said controller, correspondence data of the destination address of the packet and an address of said relay unit, to an address conversion table, as the relay information used when the protocol relay is performed; and
  referring to said address conversion table, by said controller, when receiving the packet, to convert the destination address of the received packet and the address of said relay unit.

23. The computer-readable non-transitory storage medium according to claim 17, wherein the application switch method further comprises:
  converting, by said relay unit, a TCP header of the received packet to be relayed when a protocol of a relay object comprises TCP (Transmission control Protocol).

\* \* \* \* \*